July 16, 1940.  W. GOODMAN  2,207,728
AIR CONDITIONING
Original Filed April 15, 1935  6 Sheets-Sheet 2
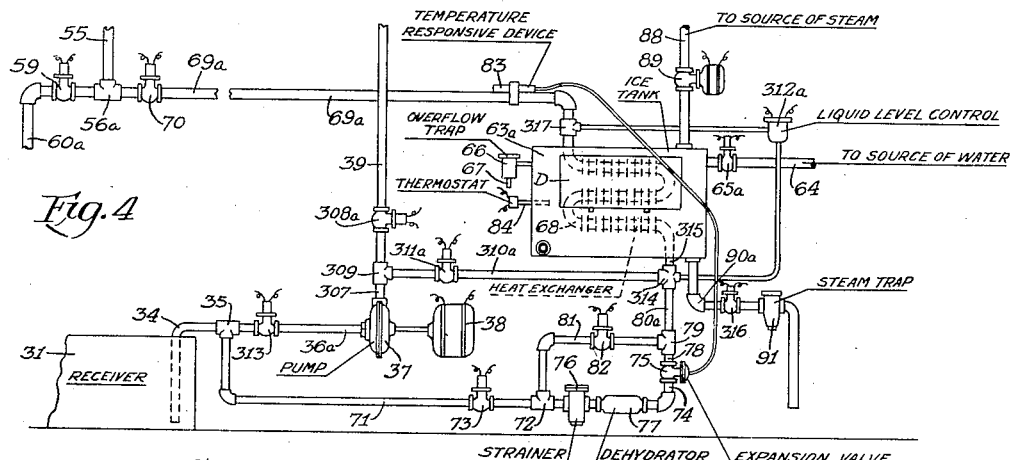
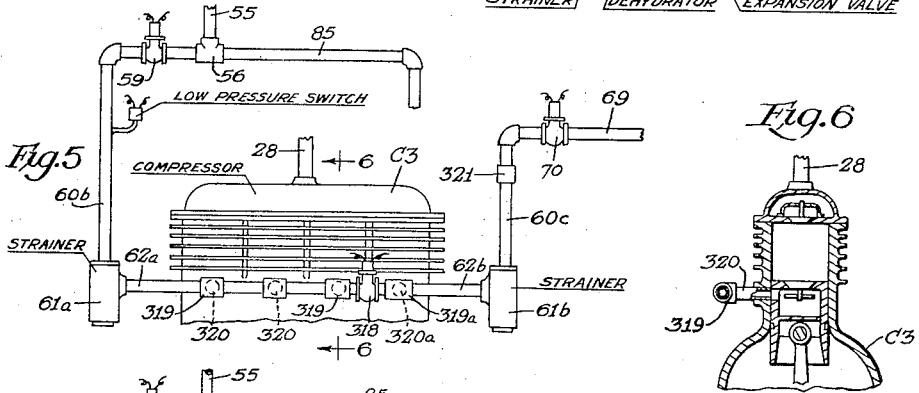
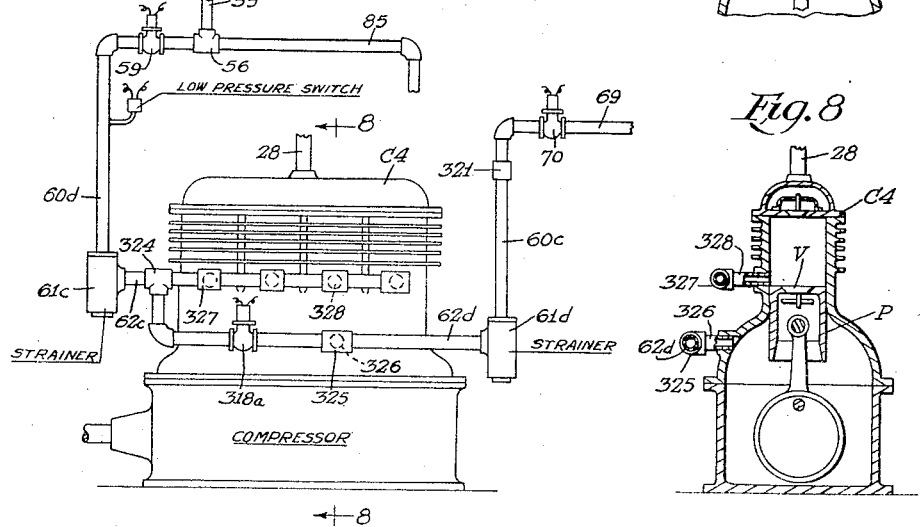
Inventor:
William Goodman
By: Wm O Bell
Atty.

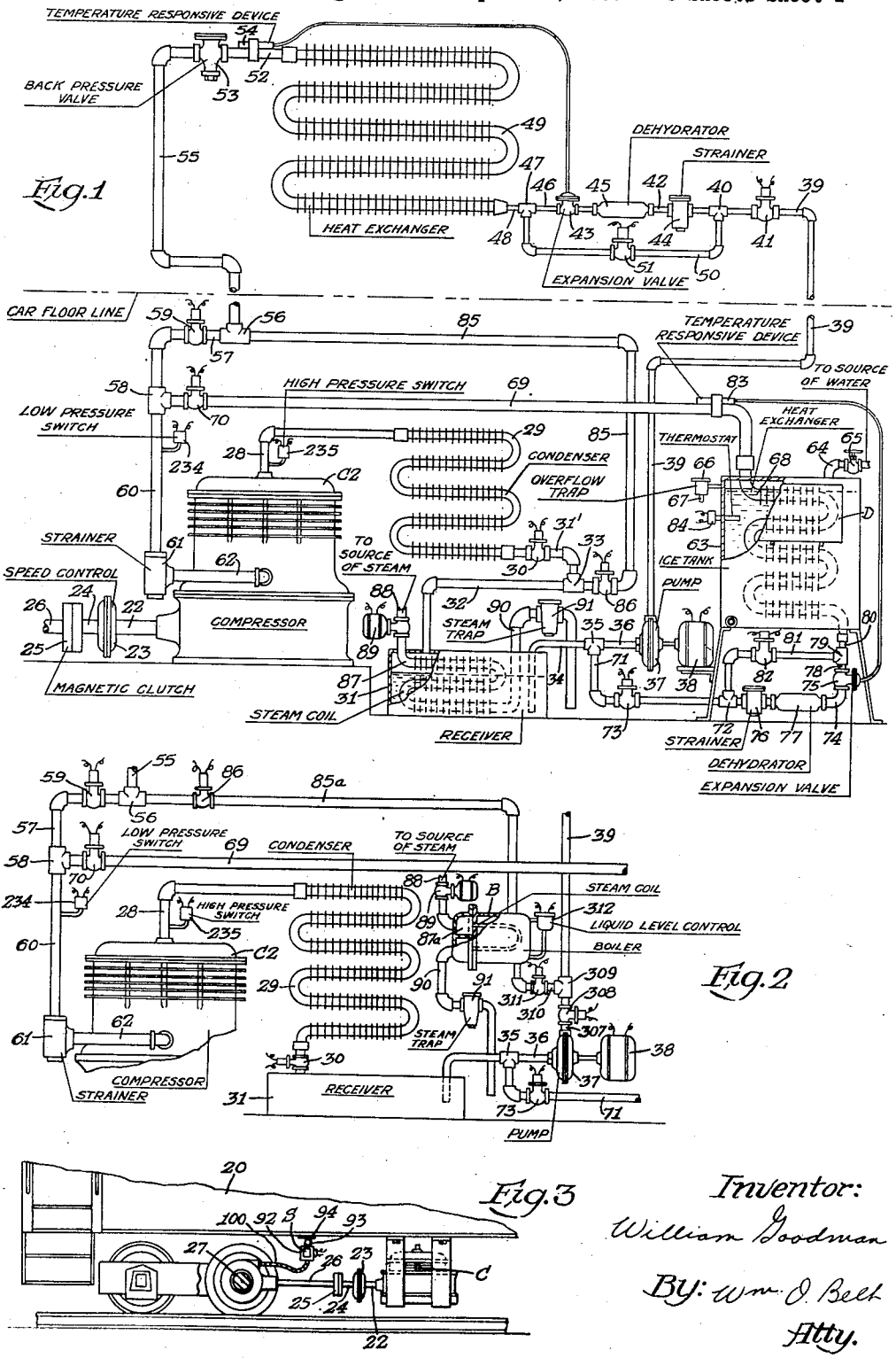
July 16, 1940. W. GOODMAN 2,207,728
AIR CONDITIONING
Original Filed April 15, 1935 6 Sheets-Sheet 1
Inventor:
William Goodman
BY: Wm J. Belt
Atty.

July 16, 1940.  W. GOODMAN  2,207,728
AIR CONDITIONING
Original Filed April 15, 1935  6 Sheets-Sheet 3

Inventor:
William Goodman
By: Wm. O. Belt
Atty.

July 16, 1940. W. GOODMAN 2,207,728
AIR CONDITIONING
Original Filed April 15, 1935 6 Sheets-Sheet 4
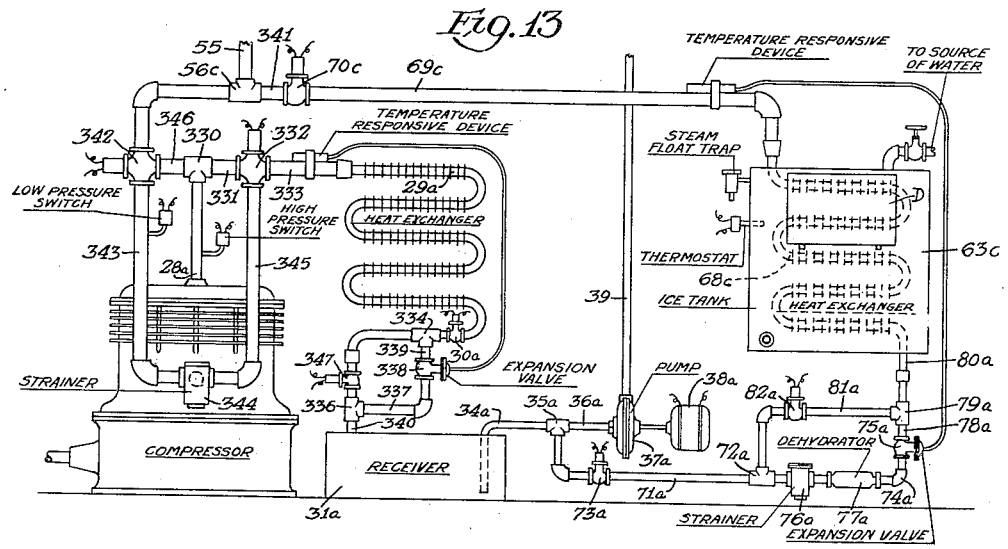
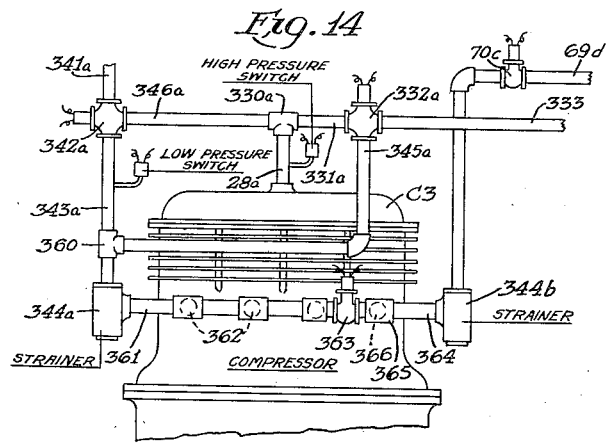
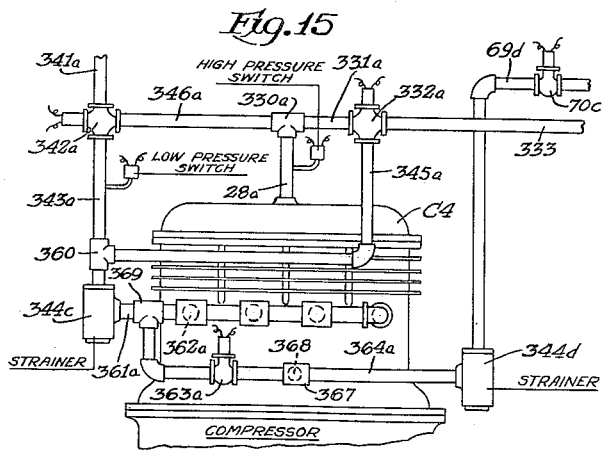
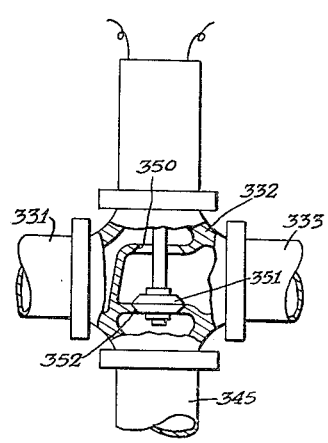
Inventor:
William Goodman
By: Wm O Bell
Atty.

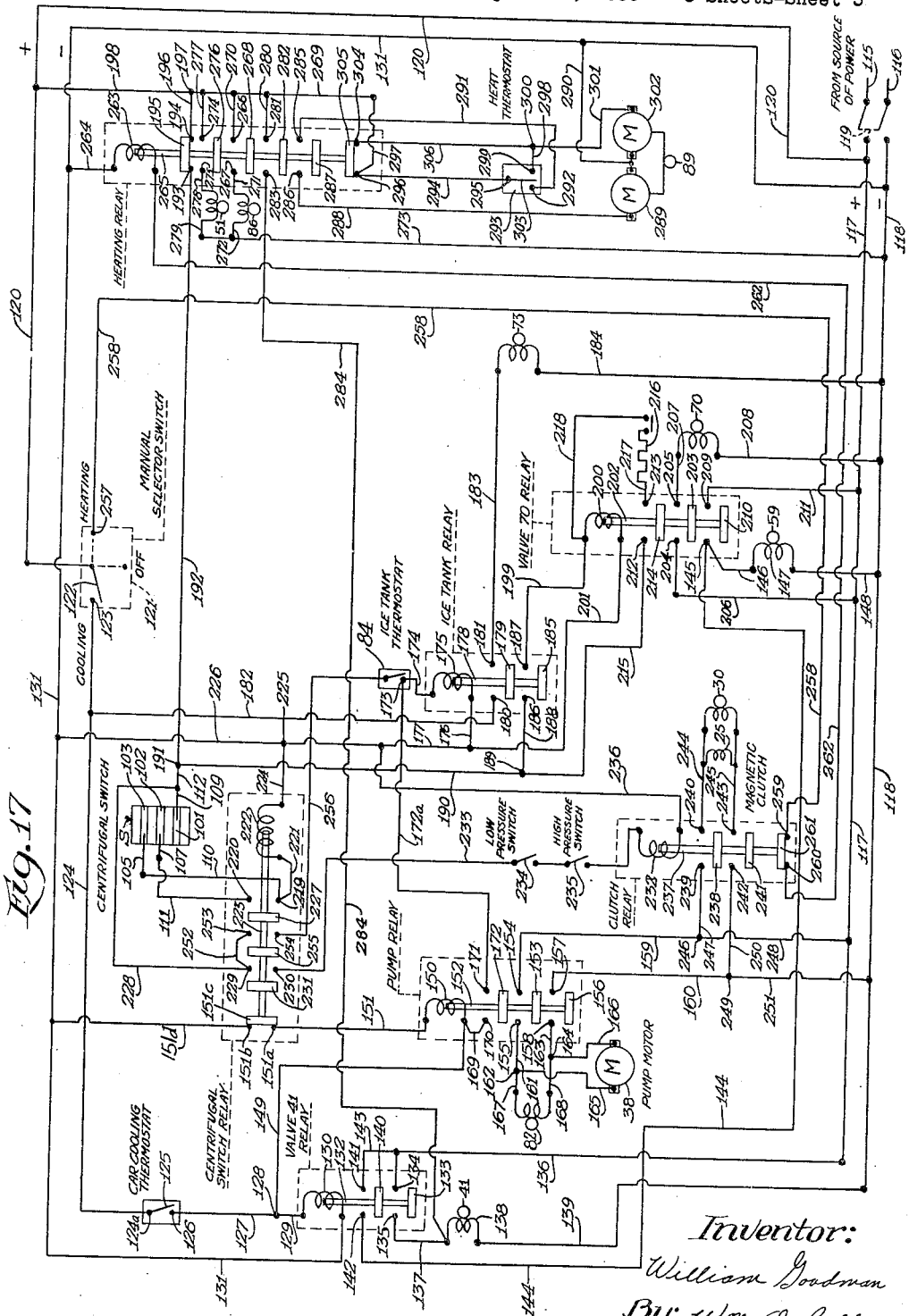
July 16, 1940.  W. GOODMAN  2,207,728
AIR CONDITIONING
Original Filed April 15, 1935    6 Sheets-Sheet 5
Inventor:
William Goodman
By: Wm. O. Belt
Atty.

July 16, 1940. W. GOODMAN 2,207,728
AIR CONDITIONING
Original Filed April 15, 1935 6 Sheets-Sheet 6

Inventor:
William Goodman
By: Wm. O. Belt
Atty.

Patented July 16, 1940

2,207,728

UNITED STATES PATENT OFFICE 2,207,728

AIR CONDITIONING

William Goodman, La Crosse, Wis.

Application April 15, 1935, Serial No. 16,306
Renewed April 10, 1940

25 Claims. (Cl. 62—6)

This invention relates to air conditioning and more particularly to the air conditioning of railway cars and the like.

The primary object of my invention is to so operate the refrigerating mechanism of an air conditioning system that refrigeration of air supplied to a railway car or the like and the accumulation of energy for subsequent refrigeration of air may be effected simultaneously or so that refrigeration of air or accumulation of energy may be effected independently or so that refrigeration of the air may be effected by utilizing accumulated energy.

Another object of my invention is to utilize substantially the same equipment for refrigerating or heating air supplied to a railway car or the like.

Other objects are to compactly arrange the air conditioning system to enable installation thereof in the available space in a railway car or the like and to utilize substantially the same equipment when refrigeration of air supplied to the car is effected by operation of a compressor-condenser-evaporator refrigerating mechanism or by utilization of accumulated energy.

Still further objects of the invention are to utilize the available energy in the axle, or other part of a railway car or the like that is driven when the car is in motion, for operating the compressor of a compressor-condenser-evaporator refrigerating mechanism and thereby refrigerate air supplied to the car and accumulate energy while the car is in motion, and to utilize the accumulated energy and continue refrigeration when energy for operating the compressor is not available, and to automatically regulate such operation of the refrigerating mechanism.

Further objects are to enable alteration of the operation of an air conditioning system from air cooling to air heating or from air heating to air cooling and to insure proper operation of the system upon such alteration of the operation; to automatically control the degree of temperature change effected in air supplied to a railway car or the like; to automatically control the temperature of the air in a railway car or the like; and to control the accumulation of energy and thereby enable efficient operation of the refrigerating mechanism.

More specific objects of the invention are to provide a heat exchanger in the air supply passage of a railway passenger car or the like and to utilize this heat exchanger as an evaporator when air flowing through the passage is to be refrigerated and to utilize this heat exchanger as a heater when the air flowing through said passage is to be heated; to enable a railway passenger car or the like to be air conditioned prior to the start of a period of use thereof; to enable operation of a refrigerating mechanism when the car is at rest by utilizing ice to condense vaporized refrigerant and to produce ice by operation of the refrigerating mechanism when the car is in motion; to mechanically circulate a refrigerant to effect direct expansion in the heat exchanger when ice is employed to condense vaporized refrigerant; and to prevent the passage of liquid refrigerant to the compressor of a compressor-condenser-evaporator refrigerating mechanism.

A still further object is to provide a novel speed responsive device for regulating operation of the air conditioning system when the railway car or the like is in operation.

Other and further objects will appear in the following description wherein reference is made to the accompanying drawings in which Fig. 1 is a view illustrating an air refrigerating and heating system for a railway car or the like;

Fig. 2 is a fragmentary view, similar to Fig. 1, showing a modified form of heating means;

Fig. 3 is a fragmentary side elevation, partly in section, illustrating the manner in which the compressor of a compressor-condenser-evaporator refrigerating mechanism may be connected to the axle of a railway car;

Fig. 4 is another fragmentary view illustrating a still further modified form of heating means;

Fig. 5 is a fragmentary view of a multi-cylinder compressor connected for use in the system shown in Fig. 1;

Fig. 6 is a sectional detail view taken substantially on the line 6—6 on Fig. 5;

Fig. 7 is a view of a multiple effect compressor connected for use in the system shown in Fig. 1;

Fig. 8 is a sectional detail view taken substantially on the line 8—8 on Fig. 7;

Fig. 13 is a view illustrating another form of my novel air refrigerating and heating system;

Fig. 14 is a view of a multi-cylinder compressor connected for use in the system shown in Fig. 9;

Fig. 15 is a view of a multiple effect compressor connected for use in the system shown in Fig. 9;

Fig. 16 is an elevational detail view, partly in section, of a three-way valve employed in the systems shown in Figs. 9, 10 and 11;

Fig. 17 is a wiring diagram of a control system for the air refrigerating and heating system shown in Fig. 1.

Figure 9:
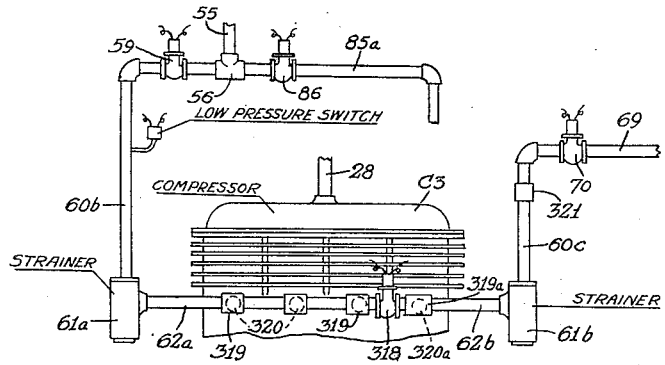
Fig. 9 is a view of a multi-cylinder compressor connected for use in the system shown in Fig. 2.

My invention is particularly adaptable for air conditioning a railway car 20 (Fig. 3) or the like. The compressor C of the compressor-condenser-evaporator refrigerating mechanism of my air conditioning system is preferably supported below the car floor by suitable brackets 21. The drive shaft 22 of the compressor is connected to a speed control device 23 of any desired type operable to limit the maximum speed at which the compressor C can be operated or to operate the compressor at a constant speed. A shaft 24 connects the speed control device to a magnetic clutch 25 or similar means for connecting the shaft 24 to the shaft 26 that is connected to an axle 27 or other part of the car operated when the car is in motion. When the magnetic clutch 25 is engaged and the car is in motion power is transmitted from the axle 27 through shaft 26 and clutch 25 to shaft 24 and the speed control device 23 to operate the drive shaft 22 of the compressor C. An arrangement such as this or any other suitable means may be employed for operating the compressor C.

The form of the invention shown in Fig. 1 includes a compressor-condenser-evaporator refrigerating mechanism having a compressor C2 which is operated in the manner previously described. The outlet pipe 28 leads from the high pressure side of the compressor to a condenser 29 which, like the compressor C2, is suitably supported below the car floor. A valve 30 is provided in the outlet pipe 31' of the condenser 29 and controls flow through this pipe. The valve 30, like other valves illustrated herein, is of the solenoid type although it is to be understood that pneumatically or hydraulically operated valves, or valves otherwise electrically operated, could be substituted for the solenoid operated valves without departing from the purview of my invention. Moreover, the valves could be used as pilot valves to control the operation of power operated valves located in the positions whereat valves are located in this disclosure of the invention.

A receiver 31, preferably insulated, is suitably supported below the car floor. A pipe 32 leads from a T-fitting 33, to which the pipe 31' is connected, to the receiver 31. A pipe 34 leads from the receiver 31 to a T-fitting 35. A pipe 36 leads from the T-fitting 35 to a pump 37 that is suitably supported below the car floor. In order to insure self-priming, the intake of the pump may be located in or below the liquid level to be maintained in the receiver 31. Preferably the pump 37 is a centrifugal or bellows pump or other type through which there may be unimpeded flow when the pump is at rest. The pump 37 is operated by the motor 38.

A pipe 39 leads from the pump 37 to a T-fitting 40 and has a solenoid valve 41 therein adjacent the fitting 40. A pipe 42 leads from the T-fitting 40 to an expansion valve 43 of approved form and preferably has a strainer 44 and a dehydrator 45 therein. A pipe 46 leads from the expansion valve 43 to a T-fitting 47 and a pipe 48 leads from the T-fitting 47 to the heat exchanger 49. A pipe 50 leads from the T-fitting 40 to the T-fitting 47 to provide a by-pass about the expansion valve 43 and has a solenoid valve 51 therein.

A pipe 52 leads from the heat exchanger 49 to a back pressure valve 53, to be described more fully hereinafter. A temperature responsive device 54 is provided on the pipe 52 for controlling the expansion valve 43 in connection with the pressure of evaporation in the heat exchanger 49.

A pipe 55 leads from the back pressure valve 53 to a T-fitting 56. In the preferred arrangement of my invention the T-fitting 56 is located below the car floor line while that part of the pipe 39 adjacent the T-fitting 40 and the T-fitting 40, pipe 42, expansion valve 43, T-fitting 47 and pipe 50 as well as the heat exchanger 49, pipe 52, temperature responsive device 54 and back pressure valve 53 are mounted above the car floor. However, the entire system may be located above or below the car floor or otherwise without departing from the ambit of my invention. The heat exchanger 49 is mounted in the air supply passage leading to the railway passenger car or the like.

A pipe 57 leads from the T-fitting 56 to a T-fitting 58 and has a solenoid valve 59 therein. A pipe 60 leads from the T-fitting 58 to the strainer 61 and a pipe 62 leads to the suction or low pressure side of the compressor C2.

The mechanism thus far described will refrigerate air flowing over the heat exchanger 49 when the car is in operation above a predetermined speed, as will be explained more fully hereinafter, but when the car is operating below the predetermined speed or when the car is at rest other means are provided for refrigerating air flowing over the heat exchanger 49.

An ice tank 63 is mounted below the car floor and includes a water inlet pipe 64 having a manually operated valve 65 therein so that when the valve 65 is opened water may flow into the tank 63. The tank 63 is also provided with an accessible door D through which cracked ice or the like may be introduced into the tank for a purpose to be explained. Water introduced into the tank 63 is to be frozen and to allow for expansion upon freezing the tank 63 is not completely filled with water, and to this end a suitable overflow device such as the steam float trap 66 is provided near the top of the tank so that when an excessive quantity of water is introduced into the tank it will flow out through the exhaust 67 of the trap 66. It is to be understood, of course, that a steam bucket trap or other suitable device could be used in place of the steam float trap 66.

A heat exchanger 68 is provided in the tank 63. A pipe 69 leads from the heat exchanger 68 to the T-fitting 58 and has a solenoid valve 70 therein. Connection of the pipe 69 to the fitting 58 provides a return for refrigerant supplied to the heat exchanger 68. Herein the heat transfer fluid is referred to as a refrigerant inasmuch as the refrigerating system of my invention is claimed herein, but it is to be understood that this term is used in a generic sense where the heat exchanger 49 is employed to heat air flowing into the car, and therefore the term "refrigerant" is employed herein as meaning a thermic fluid, that is, a fluid employed to transfer heat from one place to another.

Refrigerant is supplied to the heat exchanger 68 through a pipe 71 that leads from the T-fitting 35 to a T-fitting 72. The pipe 71 has a solenoid valve 73 therein. From the fitting 72 refrigerant flows through pipe 74 to the expansion valve 75.

The pipe 74 preferably has a strainer 76 and a dehydrator 77 therein. From the expansion valve 75 refrigerant flows to the heat exchanger 68 through pipe 78, T-fitting 79 and pipe 80. A pipe 81 extends between the T-fittings 72 and 79 and provides a by-pass about the expansion valve 75 and has a solenoid valve 82 therein. A temperature responsive device 83 is provided on the pipe 69 adjacent the evaporator 68 and controls operation of the expansion valve 75 in connection with the back pressure in the heat exchanger 68. A thermostat 84 is provided in the tank 63 to control the freezing of water in said tank.

A pipe 85 connects the T-fitting 33 to the T-fitting 56 and has a solenoid valve 86 therein. The utility of this arrangement will be described more fully hereinafter.

All of the valves employed to control the flow of refrigerant in the systems illustrated and described herein are normally closed and must be opened to effect operation of the systems.

The air conditioning system shown in Fig. 1 is also adaptable for heating air flowing over the heat exchanger 49. In order to supply heat to the system, a heating coil 87 is provided in the receiver 31 and the inlet 88 thereof has a motor operated valve 89 therein to control the flow of steam or other heating medium into the coil 87. The valve 89 may be other than motor operated and is responsive to the degree of heating required for, as will be explained, it is preferably under control of a thermostat. The outlet 90 of the coil 87 extends exteriorly of the receiver 31 and depends downwardly to permit the discharge of water or the like from the coil 87. The pipe 90 has a trap 91 or the like therein to prevent premature escape of steam or other heating medium from the coil 87.

So long as refrigeration is to be effected in the heat exchanger 49 or the evaporator 68 and the car or the like on which the system is mounted is in motion, the compressor C2 is to be operated unless the speed of the car falls below that which will efficiently operate the compressor. However, when the car is at rest or the speed thereof falls below that which will efficiently operate the compressor C2, I disconnect the compressor from the axle 27 or other part effecting operation thereof, and this can be effectively accomplished by providing a control device responsive to the speed of the car. Moreover, I control the refrigerating mechanism by a speed responsive device so that refrigeration may be effected by the compressor-condenser-evaporator refrigerating mechanism when the car is in motion or by accumulated energy when the car is at rest.

Figure 18:
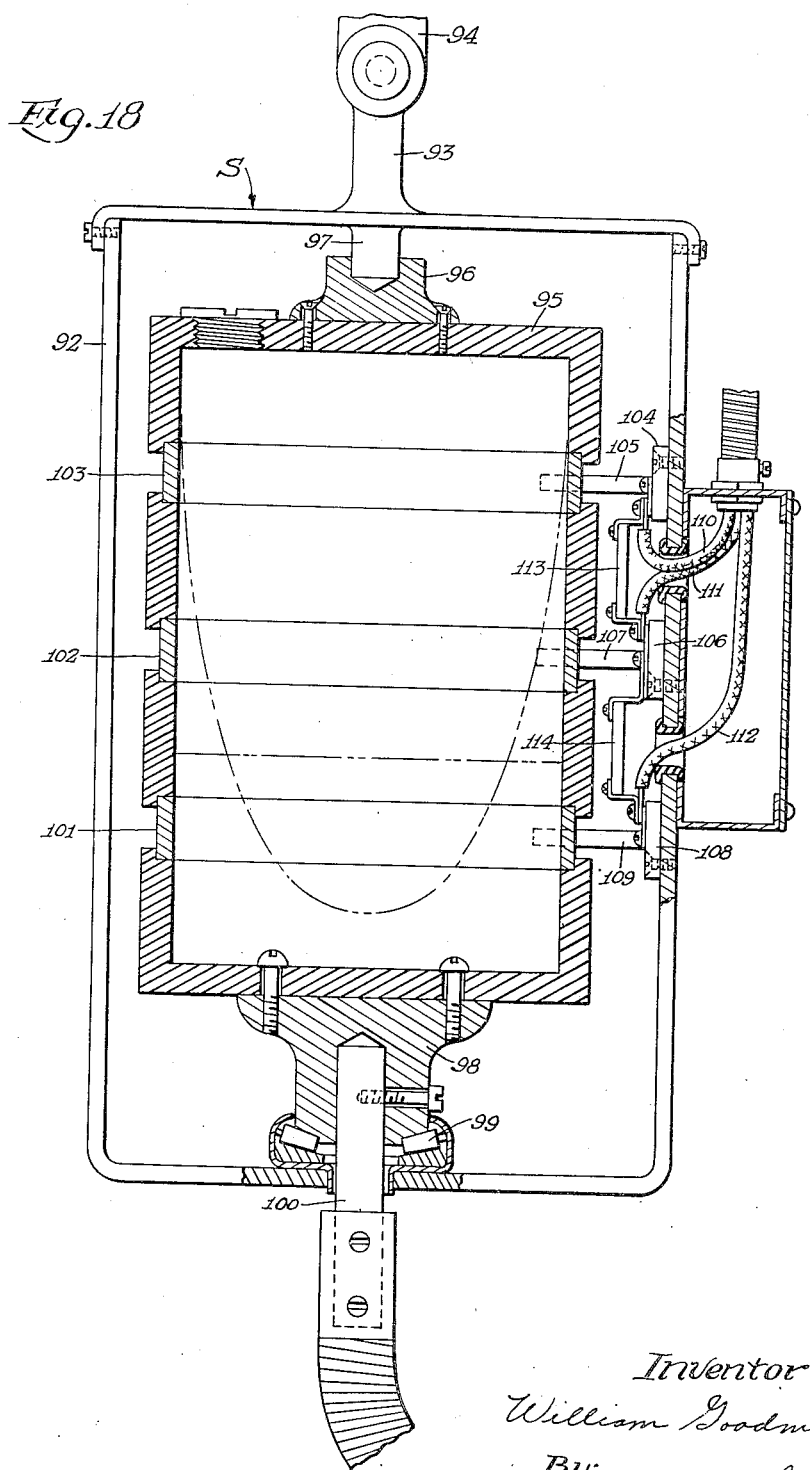
Fig. 18 is a vertical sectional detail view of a preferred form of speed responsive device employed in my invention.

One form of device responsive to the speed of the car which may be advantageously used herein is illustrated in Fig. 18 and is generally indicated by S. The speed responsive device S includes a housing 92. A boss 93 is provided at the top of the housing 92 and is hingedly connected to a bracket 94 depending from the car floor, and this hinged mounting is such that the housing 92 is free to swing parallel to the longitudinal extent of the car.

A rotor 95 of insulating material in the housing 92 has a boss 96 at the upper end thereof in which there is an opening receiving a centrally located guiding pin 97 depending from the top of the housing 92. A bearing 98 at the bottom of the rotor 95 rides on a bearing 99 and is connected to a flexible shaft 100 and, as best shown in Fig. 3, the flexible shaft 100 is connected to the axle 27 so that it will be driven upon movement of the car although the shaft 100, like the shaft 26, may be connected to any other part that is operated when the car is in motion.

The rotor 95 is in the form of a closed cup and mercury or other heavy liquid is stored therein. Conductor rings 101, 102 and 103 are provided at vertically spaced intervals in the upright wall of the rotor 95. The conductor rings are arranged to be disclosed on both the inner and outer peripheries of the rotor 95. While I have shown three conductor rings it is to be understood that any number greater than two and which can be accommodated in spaced relation in the wall of the rotor may be provided without departing from the purview of my invention.

A block 104 of insulating material is mounted on the housing 92 and carries a spring contact arm 105 that bears against the outer periphery of the conductor ring 103. Another block 106 of insulating material is mounted on the housing 92 and carries a spring contact strip 107 that bears on the outer periphery of the conductor ring 102. Still another block 108 of insulating material is mounted on the housing 92 and carries a contact strip 109 that bears on the outer periphery of the conductor ring 101. Conductors 110, 111 and 112 are respectively connected to the contacts 105, 107 and 109. A condenser 113 is provided between the contacts 105 and 107 and a condenser 114 is provided between the contacts 107 and 109 to prevent arcing, as will be explained.

When the rotor 95 is at rest the mercury or other heavy liquid collects at the bottom thereof. However, when the rotor 95 is set in operation centrifugal force causes the mercury to ascend the vertical wall of the rotor 95 and the extent of ascent is proportionate to the speed of rotation of the rotor. Thus when the rotor is rotating rather slowly the mercury so ascends that circuit is established between the conductor rings 101 and 102 but when the rotor 95 is rotating at a relatively high speed, circuit is established between the conductor ring 103 and the conductor rings 101 and 102. It will thus be seen that as the speed of rotation of the rotor 95 increases the mercury proportionately ascends the vertical wall of the rotor 95 and selectively engages the vertically spaced conductor rings provided in the vertical wall of the rotor. Likewise, as the speed of the rotor decreases the mercury descends the vertical wall of the rotor 95 and successively disengages the vertically spaced conductor rings. The condensers 113 and 114 prevent arcing that might be incident to bringing the conductor rings into or taking the conductor rings out of circuit as the mercury ascends or descends the vertical wall of the rotor 95.

The air refrigerating and heating systems of my invention are capable of operating under a number of different conditions which may be characterized as:

Condition A.—When the car is to be cooled when initially placed in service.

Condition B.—When the car is in motion and refrigerant is to be supplied only to the heat exchanger 49 to refrigerate air being supplied to the car.

Condition C.—When refrigerant is to be supplied not only to the heat exchanger 49 to refrigerate air being supplied to the car but also to the heat exchanger 68 to freeze water in the tank 63 and thereby accumulate energy.

Condition D.—When refrigerant is to be supplied only to the heat exchanger 68 as when it is desired to accumulate energy but refrigeration of air flowing over the heat exchanger 49 is not required.

Condition E.—When the compressor-condenser-evaporator refrigerating mechanism has been operating to supply refrigerant to the heat exchanger 49 to refrigerate air flowing over this heat exchanger (as under Conditions B and C) and operation of the refrigerating mechanism is interrupted but refrigeration of air flowing over the heat exchanger 49 is to be continued.

Condition F.—When air being supplied to the car past the heat exchanger 49 is to be heated. Here, the mechanism operates in the same manner when the car is initially placed in service as it does when it is in service either running or at rest.

Condition G.—This is a special condition which all of the systems which I have disclosed are not capable of performing and which is particularly useful when a railway car or the like is operated to pass from a cold climate into a warm climate and wherein heating of the car is to be carried out but at the same time energy is to be accumulated by freezing water in the tank 63.

The system disclosed in Fig. 1 is operated in the following manner to accomplish all of the foregoing conditions except the Condition G of which it is not capable.

Condition A—Fig. 1

When a car is initially placed in service and it is to be cooled, a supply of cracked ice or other refrigerating medium is introduced into the tank 63 through the door D and the system is arranged as follows: The valve 41 is opened to permit flow of liquid refrigerant through the expansion valve 43 into the heat exchanger 49 where it is vaporized as air flowing over the heat exchanger is refrigerated to cool the car. Refrigerant vaporized in the heat exchanger 49 flows through pipe 52, back pressure valve 53, pipe 55, fitting 56, pipe 57 and opened valve 59, fitting 58, and pipe 69 and opened valve 70 to the heat exchanger 68. Inasmuch as the tank 63 is filled with cracked ice the heat exchanger 68 will act as a condenser and the vaporized refrigerant will therefore be liquefied as it flows through this heat exchanger and the liquid refrigerant flows through pipe 80 to fitting 79. In order to by-pass the liquid refrigerant above the expansion valve 75, the valve 82 is opened and the liquid refrigerant flows from the fitting 79 through pipe 81 to fitting 72 from whence it flows through pipe 71 past the opened valve 73 to the fitting 35. The motor 38 will at this time be operating the pump 37 and liquid refrigerant flowing to the fitting 35 will be drawn through the pipe 36 into the pump 37 to be forced through the pipe 39 past opened valve 41 to the expansion valve 43. The motor 38 and the valve 82 are controlled in common for the motor is not operated unless the valve is open.

If more refrigerant is condensed in the heat exchanger 68 than is required by the heat exchanger 49, all of the liquid refrigerant will not flow through the pipe 36 to the pump 37 but a part will flow from the fitting 35 through the pipe 34 into the receiver 31. Likewise, if sufficient refrigerant is not condensed in the heat exchanger 68, liquid refrigerant will be drawn from the receiver 31 through pipe 34, fitting 35 and pipe 36. However, when the heat exchanger 49 is serving as an evaporator and the heat exchanger 68 is serving as a condenser, the quantity of refrigerant evaporated in the heat exchanger 49 and condensed in the heat exchanger 68 will tend to equalize. Thus, equilibrium in the action of the heat exchangers will be established and any excess or deficiency of refrigerant will be momentary and only incident to the initiation of this operation. As the heat exchanger 68 operates as a condenser, the ice in the tank 63 will melt and the resulting water should properly fill the tank 63. However, any deficiency in water in the tank 63 may be supplied by manually opening the valve 65. Any excess water in the tank 63 will be discharged through the overflow device 66, as explained.

The valves 30, 51, 86 and 89 are closed under this condition of operation.

Condition B—Fig. 1

When the compressor-condenser-evaporator refrigerating mechanism is to be operated to supply refrigerant only to the heat exchanger 49, the valve 41 is opened while the valve 51 is closed. The valve 59 is opened as well as the valve 30. The valves 70 and 86 are closed as well as the valves 73 and 82 and, since steam is not to be supplied to the coil 87 when the system is operating to supply refrigerant either to the heat exchanger 49 or the heat exchanger 68, the valve 89 is closed.

With the valves arranged in this manner refrigerant may flow from the receiver 31 through the valve 41 and past the expansion valve 43, which operates in the usual manner to maintain a supply of refrigerant to the heat exchanger 49 so long as air flowing over the heat exchanger is to be refrigerated. Since the valve 59 is open, the refrigerant may return to the suction side of the compressor C2 so long as it is operating and refrigerant forced from the compressor through the condenser 29 may flow through the opened valve 30 back to the receiver 31.

Condition C—Fig. 1

When the compressor-condenser-evaporator refrigerating mechanism is to be operated to not only supply refrigerant to the heat exchanger 49 but also to the heat exchanger 68 so as to freeze water in the tank 63, the valves 73 and 70 are opened in addition to the valves which are opened under Condition B, the other valves closed under Condition B remaining closed. Therefore, refrigerant may also flow past the valve 73 and the expansion valve 75 which functions in the manner well understood to maintain a supply of liquid refrigerant in the heat exchanger 68 so long as water in the tank 63 is to be frozen or ice is to be maintained in the tank 63, and vapor refrigerant from the heat exchanger 68 may flow past the open valve 70 to be returned to the compressor, condenser and receiver.

Operation of back pressure valve 53.

When liquid refrigerant is being supplied to both the heat exchanger 49 and the heat exchanger 68, the back pressure valve 53 is operative for inasmuch as the heat exchanger 49 is refrigerating air, which is not chilled to a low temperature, it is operating at a higher temperature and consequently a higher saturation pressure than the heat exchanger 68 which is operated at a much lower temperature than the heat exchanger 49 since it is operating to freeze water in the tank 63 and to maintain ice so produced. Therefore, the saturation pressure in the heat exchanger 68 is much lower than that in the heat exchanger 49. The suction of the compressor to which these heat exchangers are connected would tend to equalize the saturation pressure in these heat exchangers and it is the function of the back pressure valve 53 to avoid this condition. This back pressure valve 53 so functions that a saturation pressure corresponding to the temperature of refrigeration desired to be maintained in the heat exchanger 49 is set up and maintained and a higher saturation pressure is therefore maintained in the heat exchanger 49 than is maintained in the heat exchanger 68. This higher pressure prevents the temperature of refrigeration in the heat exchanger 49 from falling to or below a temperature whereat undesirable frosting on the exterior surface of the heat exchanger 49 will occur.

*Condition D—Fig. 1*

When refrigerant is to be supplied to the heat exchanger 68 and not to the heat exchanger 49, the valves are arranged as follows: The valve 41 is closed as well as the valve 51 and this shuts off the supply of liquid refrigerant to the heat exchanger 49. However, since it will be advantageous to evacuate the heat exchanger 49, the valve 59 is kept open so that upon operation of the compressor C2 any refrigerant remaining in the heat exchanger 49 will be returned to the condenser and receiver. The valve 30 is opened to permit flow of the refrigerant from the condenser to the receiver. The valve 73 is kept open so that refrigerant may flow past the expansion valve 75 as before and the valve 82 is kept closed. The valve 70 is opened so that vaporized refrigerant may be withdrawn from the heat exchanger 68 and returned to the condenser and receiver. The valves 86 and 89 remain closed.

*Condition E—Fig. 1*

When the car stops or moves so slowly that operation of the compressor C2 is interrupted and refrigeration of air flowing over the heat exchanger 49 is to be continued, the ice stored in the tank 63 is utilized to condense the refrigerant vaporized in the heat exchanger 49 and the system is operated the same as it is operated under Condition A.

*Condition F—Fig. 1*

When the heat exchanger 49 is to function as a heater, the system is arranged as follows: The valve 89 is operated by a thermostat responsive to the temperature of air leaving the heat exchanger 49 so that when the temperature of air falls the valve 89 is opened to admit steam into the coil 87 and when the temperature of air rises the valve 89 is closed to shut off steam to the coil 87. Steam supplied to the coil 87 vaporizes refrigerant in the receiver 31 and the vaporized refrigerant flows through pipe 32 to fitting 33. The valve 30 is closed at this time to prevent flow of the vapor refrigerant into the condenser 29 but the valve 86 is open so that the heated vapor refrigerant may flow through the pipe 85 to the fitting 56. From the fitting 56 the refrigerant flows through pipe 55 to back pressure valve 53. Inasmuch as the refrigerant in the receiver 31 may be heated by the steam flowing through the coil 87 to a temperature closely approximating the temperature of the steam, a relatively high saturation pressure is established in the receiver 31 when steam flows through coil 87. This pressure is always sufficiently high to open the back pressure valve 53 wide and so long as the relatively high pressure refrigerant is supplied through the pipe 55 the valve 53 will remain open. From the valve 53 the refrigerant flows through pipe 52 into heat exchanger 49 from whence it flows through pipe 48 to fitting 47 and the valve 51 is opened at this time so that the refrigerant is by-passed about the expansion valve 43 through the pipe 50 to the fitting 40 from whence the refrigerant flows through pipe 39, for at this time the valve 41 will be open, and from pipe 39 the refrigerant flows through pump 37, fitting 35 and pipe 34 back into the receiver 31. The valves 73 and 82 are kept closed at this time to prevent the flow of heated refrigerant into the heat exchanger 68.

Likewise, the valves 59 and 70 are kept closed and closing of the valve 59 prevents the heated refrigerant from collecting in the pipe 60, strainer 61 and pipe 62. This is important for these parts are exposed below the car, and when the heat exchanger 49 is functioning as a heater the temperature about the pipe 60, strainer 61 and pipe 62 may be low enough to condense any refrigerant collected therein with the result that if the compressor C2 was set in operation with liquid in the pipe 62, for example, serious damage to the compressor might result.

The control of the system shown in Fig. 1 may be effected in a number of ways to establish the various operating conditions and, of course, it may be done manually but it is advantageous to perform this control automatically. One form of automatic control is shown in Fig. 17 and this is electrical. While the disclosure is such that the various valves are electrically operated to effect the desired set-ups of the system, the valves shown in Fig. 17 could control the flow of fluid to the valves shown in Fig. 1 in which instance the valves in Fig. 17 would serve as pilot valves and the valves shown in Fig. 1 would either be pneumatically or hydraulically operated. The control system shown in Fig. 17 is but an illustrative arrangement and other systems may be used without departing from the purview of my invention.

Power for operating the control shown in Fig. 17 is supplied through the line wires 115 and 116 which may be respectively connected to the distributing wires 117 and 118 by the switch 119, and when the switch 119 is open the entire control is rendered inoperative.

When the switch 119 is closed current is supplied through the conductor 120 to one terminal of a manual selector switch 121. This manual selector switch may be arranged in an off position or it may be thrown into position wherein the control system is arranged to control cooling of air flowing over the heat exchanger 49 or into a position to control heating of air flowing over this heat exchanger. When air flowing over the heat exchanger 49 is to be cooled or refrigerated, the blade 122 of the switch 121 is engaged with the terminal 123. A conductor 124 connects the terminal 123 with the terminal 124a in the thermostat 125 that is located at a selected position in the car. When the temperature of air affecting the thermostat 125 rises above a predetermined maximum, circuit is closed through this thermostat to the terminal 126. A conductor 127 leads from the terminal 126 to the terminal 128. If the car is at rest at this time and the tank 63 is filled with ice and low temperature water, the operation of the device is as follows:

Current will flow from the terminal 128 through the conductor 129 to one terminal of the winding 130 of the valve 41 relay. From the other terminal of the winding 130 current flows through the conductor 131 to the distributing wire 118. The winding 130 is thus energized and the armature 132 thereof is attracted whereupon the contact 133 closes the circuit between the terminals 134 and 135. A conductor 136 connects the terminal 134 with the distributing wire 117. A conductor 137 leads from terminal 135 to one terminal of the winding 138 of the solenoid of the valve 41 and from the other terminal of this winding current flows through the conductor 139 to the distributing wire 118 and in this manner the valve 41 is opened.

When the armature 132 is attracted, the contact 140 closes circuit between the terminals 141 and 142. A conductor 143 connects the terminal 141 with the conductor 136. A conductor 144 leads from the terminal 142 to a terminal 145 in the valve 70 relay. A conductor 146 leads from the terminal 145 to one terminal of the winding 147 of the solenoid of the valve 59 and a conductor 148 connects the other terminal of this winding to the distributing wire 118. Therefore the solenoid of valve 59 is energized and this valve is opened along with valve 41.

Inasmuch as the heat exchanger 68 is to serve as a condenser, the pump 37 must be set in operation and this is brought about by starting the motor 38 simultaneously with the just described opening of the valves 41 and 59. To this end a conductor 149 is connected to the terminal 128 and this conductor leads to one end of the winding 150 of the pump relay, the other end of said winding being connected to a terminal 151a by a conductor 151. The terminal 151a is provided in the centrifugal switch relay in which there is another terminal 151b and circuit between these terminals is normally closed by a contact 151c in the relay. The terminal 151b is connected to wire 131 by a conductor 151d. Thus when the thermostat 125 is closed, the winding 150 is energized and the armature 152 is attracted. The armature 152 carries a contact 153 that closes circuit between terminals 154 and 155 when the armature 152 is attracted and simultaneously with the closing of circuit between terminals 154 and 155 the contact 156 on armature 152 closes circuit between terminals 157 and 158. A conductor 159 connects the terminal 154 with the distributing wire 117 and a conductor 160 connects the terminal 157 with the distributing wire 118. A conductor 161 leads to a terminal 162 from the terminal 155. A conductor 163 leads from terminal 158 to a terminal 164. A wire 165 leads from terminal 162 to one pole of the motor 38 and a conductor 166 leads from the other pole of the motor to terminal 164. Thus when circuit is closed between the contacts 154 and 155 and 157 and 158, the motor 38 is set in operation.

As has been explained, at the time the motor 38 is set in operation to circulate refrigerant condensed in the heat exchanger 68 the valve 82 should be opened to by-pass the condensed refrigerant about the expansion valve 75 and therefore the winding of the solenoid of the valve 82 is connected to the same terminals as those to which the motor 38 is connected. Thus a conductor 167 leads from the terminal 162 to one end of the winding of the solenoid of the valve 82 and a conductor 168 leads from the other end of this winding to the terminal 164. Hence when circuit is closed to the terminals 162 and 164 to operate the motor 38, the valve 82 is also opened.

As has been explained, the valves 70 and 73 must also be opened when the heat exchanger 68 is to serve as a condenser and this is accomplished in the following manner:

A conductor 169 is connected to the terminal of the winding 150 whereat the conductor 149 is connected and this conductor leads to a terminal 170 in the pump relay. Another terminal 171 is provided in this relay so that when the armature 152 is attracted the contact 172 may close the circuit between the terminals 170 and 171. A conductor 172a leads from the terminal 171 to a terminal 173 in a thermostat to be described more fully hereinafter. A conductor 174 leads from the terminal 173 to one end of the winding 175 of the ice tank relay and the other end of this winding is connected to a conductor 176 that is connected to a conductor 177 that is connected to conductor 131. When the winding 175 is energized upon closing of the circuit between the terminals 170 and 171, the armature 178 is attracted. On the armature 178 is a contact 179 which, when the armature is attracted, closes the circuit between the terminals 180 and 181. The terminal 180 is connected by a conductor 182 to the conductor 124. A conductor 183 leads from the terminal 181 to one end of the winding of the solenoid of the valve 73 and the other end of this winding is connected to the distributing wire 118 by a conductor 184. Hence the valve 73 is opened at the same time as that at which the valves 41, 59 and 82 are opened.

Another contact 185 on the armature 178 closes the circuit between the terminals 186 and 187 when said armature is attracted. A conductor 188 leads from the terminal 186 to a terminal 189. A conductor 190 leads from the terminal 189 to a terminal 191. A conductor 192 leads from the terminal 191 to a terminal 193 in the heating relay and circuit from the terminal 193 to another terminal 194 in this relay is normally closed by a contact 195 mounted on the armature of this relay. A conductor 196 is connected to a terminal 197 from which a conductor 198 leads to the conductor 120. A conductor 199 leads from the terminal 187 to one end of the winding 200 of the valve 70 relay, the other terminal of this winding being connected to conductor 177 by a conductor 201. Thus when the winding 200 is energized the armature 202 is attracted and the contact 203 thereon closes circuit between the terminals 204 and 205. A conductor 206 connects the terminal 204 to the distributing wire 117. A conductor 207 leads from the terminal 205 to one end of the winding of the solenoid of the valve 70 and the other end of this winding is connected to the distributing wire 118 by a conductor 208, and when the winding of the solenoid of valve 70 is energized this valve is opened along with the valves 41, 59, 82 and 73.

A terminal 209 is provided in the valve 70 relay and is associated with the terminal 145. A contact 210 closes the circuit between the terminals 145 and 209. The contact 209 is connected to the distributing wire 117 by a conductor 211. Thus when circuit is closed between the contacts 145 and 209, circuit to the winding 147 of the solenoid of valve 59 is closed, which circuit is in parallel with the circuit to this winding previously closed by closing the circuit between the terminals 141 and 142 in the valve 41 relay.

Terminals 212 and 213 are provided in the valve 70 relay and circuit between these terminals is closed by a contact 214 when the winding 200 is energized. Terminal 212 is connected to the terminal 189 by a conductor 215. One terminal of a thermal relay 216 is connected to terminal 213 by a conductor 217 and the other terminal of this relay is connected to the terminal of the winding 200, whereat the conductor 199 is connected, by a conductor 218. The thermal relay 216 serves to maintain a circuit through the winding 200 after circuit to this winding is broken by the disengagement of contact 185 from terminals 186 and 187 in the ice tank relay. Thus, breaking of the circuits closed by the valve 70 is delayed for a short time interval until the thermal relay opens, and this serves to maintain the valves 59 and 70 open so that the compressor C2 may evacuate refrigerant from the heat exchanger 68.

The circuits thus far described are closed each time the heat exchanger 68 is to operate as a condenser. However, when the car is in motion and it is desired to refrigerate air flowing over the heat exchanger 49 and it is not necessary to refrigerate the tank 63, somewhat different circuits are closed as follows: When the car is in motion the speed responsive device S, such as that illustrated in Fig. 18, is operated and when the device includes a rotor, such as the rotor 95 having mercury therein, the mercury will first close a circuit between the conductor rings 101 and 102, and as the speed increases circuit will be closed between the conductor rings 101 and 102 and 103. When circuit is closed between the conductor rings 101 and 102 and 103, current flows from the terminal 191 through conductor 112 to the contact 109 which bears on conductor ring 101, and when the mercury closes the circuit between the conductor rings 101 and 103 circuit is closed to the contact 105 and current flows through the conductor 110 to terminal 219 in the centrifugal switch relay. Of course, when the circuit is closed to the conductor ring 103 it will have previously been closed to conductor ring 102 and current will flow through contact 107 and conductor 111 to terminal 220 which cooperates with terminal 219, as will be explained. A conductor 221 leads from terminal 219 to one end of the winding 222 of the centrifugal switch relay, and when circuit is closed to the contact 219 the winding 222 is energized inasmuch as the other terminal thereof is connected by a conductor 224 to a terminal 225 that is connected to the conductor 131 by a conductor 226. When the winding 222 is energized, the contact 227 closes the circuit between the terminals 219 and 220. It will be noted that circuit is not closed to the winding 222 until circuit is closed to the conductor ring 103. However, when circuit is closed to the conductor ring 103, the terminal 219 is connected to the conductor ring 102 by reason of the engagement of contact 227 with terminals 219 and 220. Thus the winding 222 is not energized until a predetermined speed is attained but this winding is kept energized when the speed falls below this predetermined speed and it is not deenergized until there is an appreciable reduction in speed sufficient to take the conductor ring 102 out of circuit. Hence, there may be a variation in the speed of operation of the car without a resultant starting and stopping of the mechanisms controlled by the centrifugal switch relay.

The centrifugal switch relay controls operation of the devices which supply refrigerant to the heat exchanger 49. When the winding 222 is energized, the armature 223 is attracted whereupon the contact 151c is disengaged from the terminals 151a and 151b which opens the circuit to the winding 150 of the pump relay whereupon operation of the motor 38 is interrupted and the valve 82 is closed. Deenergizing of the winding 150 also opens the circuit to the winding 175 of the ice tank relay by disengaging the contact 172 from the terminals 170 and 171. Deenergizing of the winding 175 disengages the contact 179 from the terminals 180 and 181 whereupon circuit to the winding of the solenoid of valve 73 is opened and this valve is closed. Deenergizing of the winding 175 also disengages contact 185 from terminals 186 and 187 which interrupts flow of current through conductor 199 and would tend to deenergize the winding 200 of valve 70 relay were it not for the fact that circuit to this winding is maintained for a short time after contact 185 disengages contacts 186 and 187 by the thermal relay 216. However, when the thermal relay 216 functions to open the circuit to the winding 200, the contact 203 disengages the terminals 204 and 205 and opens the circuit to valve 70, which valve thereupon closes.

Whenever air flowing over the heat exchanger 49 is to be refrigerated, the thermostat 125 will be closed and consequently the winding 130 of valve 41 relay will be energized with the result that circuits to the solenoids of the valves 41 and 59 will remain closed and these valves will be open. Further, the centrifugal switch controls operation of the devices supplying refrigerant to the heat exchanger 49 to refrigerate air flowing over this heat exchanger for when the car is in motion the contact 151c is disengaged from the contacts 151a and 151b and the pump 38 cannot be operated but, as will be explained, the compressor C2 is operated. Likewise, when the car is at rest circuit is closed to the pump but the circuit controlling the compressor is open.

The compressor C2 is to be operated when the winding 222 is energized and therefore circuit is closed to the magnetic clutch 25 and this is brought about in the following manner: A conductor 228 is connected to the conductor 112 and leads to a terminal 229 in the centrifugal switch relay. Another terminal 230 is provided in this relay and when the winding 222 is energized the contact 231 closes the circuit between the terminals 229 and 230 whereupon circuit is closed to the winding 232 of the magnetic clutch relay through conductor 233 in which the low pressure switch 234 (Fig. 1) and the high pressure switch 235 (Fig. 1) are provided, these two switches normally being closed. The switch 234 opens circuit to the magnetic clutch relay to stop the compressor when the suction pressure of the compressor drops to a predetermined minimum, and the switch 235 opens circuit to this relay when the discharge pressure of the compressor reaches a predetermined maximum. The winding 232 is also connected to the conductor 177 by a conductor 236 so that when circuit is closed between the contacts 229 and 230 this winding is energized. When the winding 232 is energized, the armature 237 is attracted and attraction of this armature causes the contact 238 to close the circuit between the terminals 239 and 240 and the contact 241 to close the circuit between the terminals 242 and 243. The magnetic clutch 25 and the winding of the solenoid of the valve 30 are connected to the terminals 240 and 243 by conductors 244 and 245, respectively. The terminal 239 is connected to the terminal 246 by a conductor 247 and the terminal 246 is connected to the distributing wire 117 by a conductor 248 which is a continuation of the conductor 159. The terminal 242 is connected to a terminal 249 by a conductor 250 and the terminal 249 is connected to the distributing wire 118 by a conductor 251 which is a continuation of the conductor 160. Thus when the contacts 238 and 241 close circuit between their cooperating terminals, the magnetic clutch 25 is engaged and the valve 30 is opened.

The foregoing circuits remain closed so long as the thermostat 125 is closed but if the temperature of the air affecting this thermostat falls below the setting of the thermostat it opens and thereupon the winding 130 of the valve 41 relay is deenergized and this opens the circuit to the solenoids of the valves 41 and 59 which thereupon close. However, the compressor C2 continues to operate but this reduces the pressure in the pipe 60, strainer 61 and pipe 62, and when a predetermined low pressure is reached in these parts the switch 234 operates to open the circuit to the winding 232 of the magnetic clutch relay whereupon the magnetic clutch is deenergized as well as the solenoid of the valve 30 and the clutch is disengaged, interrupting operation of the compressor, and the valve 30 is closed. When, however, the temperature of air surrounding the thermostat 125 rises to a predetermined degree, the thermostat is again closed whereupon refrigerant is again supplied to the heat exchanger 49 in a manner previously described for this reenergizes the winding 130 and opens valves 41 and 59, and this raises the pressure in the heat exchanger 49 and the pipe 60, strainer 61 and pipe 62 whereupon the low pressure switch 234 closes and the winding 232 is reenergized to reengage the magnetic clutch 25 and open the valve 30.

When it is desired to refrigerate air flowing over the heat exchanger 49 and also to refrigerate the tank 63, the relay windings 130 and 232 remain energized. However, the ice tank thermostate 84 will close at this time and current is supplied to this thermostat, when the car is in operation, in the following manner:

A conductor 252 leads from the terminal 229 to the terminal 253 in the centrifugal switch relay. Another terminal 254 is provided in this relay and when the winding 222 is energized a contact 255 closes circuit between the terminals 253 and 254. Terminal 254 is connected to the thermostat 84 by a conductor 256. Thus when the thermostat 84 closes, circuit is established through conductor 174 to winding 175 of the ice tank relay whereupon the valves 73 and 70 are opened which, as described, permits refrigerant to circulate through the heat exchanger 68. As previously explained, the energizing of the winding 175 establishes another circuit to the solenoid of the valve 59 in parallel with the circuit to this solenoid established through the valve 41 relay.

When the tank 63 is to be refrigerated but air flowing over the heat exchanger is not to be refrigerated, the thermostat 125 opens which breaks the circuit to the winding 130 of the valve 41 relay and this opens circuit to the solenoid of the valve 41 and it also opens one of the parallel circuits to the valve 59, but this valve remains open inasmuch as the winding 175 of the ice tank relay will be energized by reason of the fact that the thermostat 84 will be closed. Thus only the valve 41 is closed which shuts off flow of refrigerant to the heat exchanger 49 but refrigerant continues to flow through the heat exchanger 68 and refrigerates the tank 63.

The foregoing description describes the manner in which the controls operate when the heat exchanger 49 is to operate as an evaporator but when this heat exchanger is to operate as a heater the controls are arranged in the following manner:

First, the blade 122 of the switch 121 is engaged with the terminal 257. This disconnects the thermostat 125 and renders the parts controlled by this thermostat inoperative.

A conductor 258 leads from the terminal 257 to a terminal 259 in the magnetic clutch relay. A terminal 260 is provided in this relay and circuit between these terminals is closed by a contact 261. This arrangement is utilized to keep the compressor C2 operating in event the compressor has been supplying refrigerant to the heat exchanger 68 so that any refrigerant in this heat exchanger may be returned to the receiver 31 in event the switch blade 122 is swung from engagement with the terminal 123 directly into engagement with the terminal 257. Therefore, a conductor 262 leads from the terminal 260 to one end of the winding 263 of the heating relay. A conductor 264 leads from the other end of this winding to the conductor 131. However, if the compressor C2 has been operating, the winding 232 will have been energized and therefore the contact 261 will be disengaged from the contacts 259 and 260 with the result that circuit is not closed to the winding 263 as soon as the blade 122 engages the terminal 257. When the blade 122 disengages the terminal 123, circuit through conductor 182, terminal 180, contact 179, terminal 181, conductor 183, solenoid of valve 73 and conductor 184 is broken and valve 73 closes so that no more refrigerant is supplied to the evaporator 68. I have already explained that, when blade 122 disengages contact 123, circuit to the thermostat 125 is interrupted and that valve 41 is therefore closed. However, the valves 59 and 70 remain open and when the winding 232 is energized and the compressor continues to operate until the pressure in pipe 60 reaches a predetermined minimum, the low pressure switch 234 opens and breaks the circuit to winding 232, thus deenergizing the magnetic clutch relay 232, disengaging the clutch and closing valve 30. This will not occur until substantially all of the refrigerant has been returned to the receiver 31. However, as soon as the winding 232 is deenergized the contact 261 bridges the terminals 259 and 260 and closes circuit to the winding 263 whereupon the armature 265 of the heating relay is attracted. When the armature 265 is attracted, the contact 195 is disengaged from the terminals 193 and 194 and circuit to the centrifugal switch is broken and operation of the parts controlled by the centrifugal switch relay will be prevented until the heating device relay is deenergized which will not occur until the blade 122 is disengaged from the terminal 257.

In order for vapor from the receiver 31 to circulate to the heat exchanger 49, it is necessary that the valve 86 be opened and this is brought about as soon as the winding 263 of the heating device relay is energized. Terminals 266 and 267 are provided in the heating relay and a contact 268 on the armature 265 is adapted to close the circuit between these terminals. The terminal 266 is connected to conductor 269 by a conductor 270. The conductor 269 is connected to terminal 197. A conductor 271 leads from the terminal 267 to the winding of the solenoid of valve 86 and a conductor 272 connects the other end of this winding to a conductor 273 that is connected to distributing wire 118. Thus when the contact 268 closes the circuit between the terminals 266 and 267, the solenoid of valve 86 is energized and this valve is opened.

The valve 51 must also be opened when the heat exchanger 49 is operating as a heater in order to by-pass the refrigerant about the expansion valve 43 and to this end terminals 274 and 275 are provided in the heating relay, and when the contact 276 closes circuit between these terminals the winding of the solenoid of valve 51 is energized, current flowing from conductor 269 through conductor 277, terminal 274, contact 276, terminal 275, conductor 278, winding of the solenoid of valve 51, conductor 279 to conductor 273.

The valve 41 must now be opened to permit the refrigerant by-passed about the expansion valve 43 to return to the receiver 31 and to this end a conductor 280 leads from the conductor 269 to a terminal 281 in the heating relay. When the heating relay is energized, a contact 282 closes the circuit between terminal 281 and a terminal 283 to which a conductor 284 is connected that leads to one terminal of the winding of the solenoid of valve 41 and the other terminal of this winding is connected to the conductor 118 by conductor 139. Closing of this circuit opens valve 41.

The motor operated valve 89 is also controlled by the heating relay and a pair of terminals 285 and 286 are provided in the relay between which circuit is closed by a contact 287 when the winding 263 is energized. A conductor 288 is connected to the terminal 286 and to one terminal of the opening motor 289 of the motor operated valve 89. A conductor 290 leads from the other terminal of the motor 289 to the wire 131. A conductor 291 is connected to the terminal 285 and to a terminal 292 in the thermostat 293. A conductor 294 is connected to the terminal 295 in the thermostat and to a terminal 296 in the heating relay. A conductor 297 connects the terminal 296 with the conductor 269. A conductor 298 leads from the terminal 299 in the thermostat 293 to a terminal 300. A conductor 301 leads from the terminal 300 to one terminal of the closing motor 302 of the motor operated valve 89.

When the winding 263 is energized and the contact 287 closes the circuit between the terminals 285 and 286, the motor operated valve 89 is under control of the thermostat 293. The terminal 295 of the thermostat is connected to the conductor 269 which in turn is connected with the distributing line 117. When the blade 303 of the thermostat moves into engagement with the contact 292 circuit is closed through the opening motor 289 as follows: From terminal 292 through conductor 291, terminal 285, contact 287, terminal 286, conductor 288, motor 289, conductor 290 to conductor 131 and thence to distributing wire 118. This operates to open the valve 89 and admits steam into the coil 87 which occurs when the temperature in the car falls below a predetermined minimum. When the temperature in the car rises above a predetermined maximum, the blade 303 moves into engagement with the terminal 299 and circuit is closed through conductor 298, terminal 300, conductor 301, motor 302 and conductor 290, and this motor then operates to close the valve 89. It will be understood that when either the contact 292 or the contact 299 is engaged by the blade 303 either the motor 289 or the motor 302 is set in operation. Each motor operates only to open or close the valve, whichever its function may be, and a limit switch in the motor (not shown) breaks the circuit after the function has been performed.

When the heating relay 263 is deenergized, it is essential that the valve 89 be closed and to this end a terminal 304 is provided in the relay which is associated with the terminal 296. When the relay is deenergized a contact 305 closes circuit between the terminals 296 and 304 and current is supplied to the motor 302 as follows: From conductor 269 through conductor 297, terminal 296, contact 305, terminal 304, conductor 306, terminal 300, conductor 301, motor 302, and conductor 290 to conductor 131, and this so operates the motor 302 that the valve 89 is closed, the limit switch in the motor interrupting this circuit when the valve 89 attains closed position.

When the blade 122 is in the off position, that is, disengaged from both the terminals 123 and 257, the car heating and cooling devices are both rendered inoperative but the contact 195 in the heating relay closes the circuit between the contacts 193 and 194 and energizes those parts of the apparatus controlled by the ice tank thermostat 84 so that the compressor C2 may be operated to supply refrigerant to the heat exchanger 68 to refrigerate the tank 63 when the car is in motion. Of course, when the car is at rest circuit to the magnetic clutch relay is opened by reason of the fact that the centrifugal switch relay will be opened, and therefore even though the ice tank thermostat 84 is closed the compressor C2 will not be operated but when the car is in motion and the thermostat 84 is closed the compressor will be operated and the tank 63 will be refrigerated.

In event the system shown in Fig. 1 was to be used only for refrigerating air flowing over the heat exchanger 49, the by-pass pipe 50 and the valve 51 therein could be eliminated as could the valve 59. Furthermore, the condenser 29 could be directly connected in the pipe 32 of the receiver and the valve 30, fitting 33, valve 86 and pipe 85 could be omitted and the pipe 55 would be directly connected to the pipe 57 thereby eliminating the T-fitting 56. Furthermore, the heating coil 87 and its associated parts would be eliminated. The remaining parts would be operated in the manner previously described.

In Fig. 2 an air refrigerating and heating system much like that shown in Fig. 1 is disclosed but herein a boiler B is provided instead of providing the coil 87 in the receiver 31. Similar parts in Figs. 1 and 2 are numbered identically and the pipe 55 of Fig. 2, like the pipe 55 of Fig. 1, leads to the back pressure valve 53 and the pipe 39 in Fig. 2 leads to the T-fitting 40 and has the valve 41 therein. The pipe 71 leads to T-fitting 72 and the pipe 69 is connected to the heat exchanger 68, and these parts as well as the ice tank 63 are identical with similar parts shown in Fig. 1.

In the system shown in Fig. 2 a pipe 307 is connected to the discharge of the pump 37 and has a solenoid valve 308 therein. The pipe 307 is connected to a T-fitting 309 to which the pipe 39 is connected. A pipe 310 is connected to the fitting 309 and leads to the boiler B. A solenoid valve 311 is provided in the pipe 310 to control flow therethrough. A pipe 85a leads from the boiler B to the T-fitting 56 and has the valve 86 therein. A liquid level control 312 is provided for maintaining a supply of refrigerant in the boiler B. The steam inlet pipe 88 leads into the heating parts 87a of the boiler B and the pipe 90 leads from these parts and has the trap 91 therein and this pipe and trap function in precisely the same manner as in the system of Fig. 1.

The system shown in Fig. 2 is operable under all of the conditions previously described, that is to say, the system shown in Fig. 2 may be operated under the Condition G as well as under the other conditions.

Condition A—Fig. 2

When a car is initially placed in service and it is to be cooled, a supply of cracked ice or other refrigerating medium is introduced into the tank 63 as was done in the system shown in Fig. 1 and the system of Fig. 2 is arranged as follows: The valves 308 and 41 are opened to permit flow of liquid refrigerant through the expansion valve 43 into the heat exchanger 49 as air flowing over the heat exchanger is refrigerated. Refrigerant vaporized in the heat exchanger 49 flows back through pipe 52, back pressure valve 53, pipe 55, fitting 56, pipe 57 and opened valve 59, fitting 58, pipe 69 and opened valve 70 to the heat exchanger 68, and since the tank is filled with cracked ice the vaporized refrigerant is liquefied as it flows through the heat exchanger 68 and the liquid refrigerant flows through pipe 80 to fitting 79. The liquid refrigerant is by-passed about the expansion valve 75 through pipe 81 past opened valve 82 and flows to fitting 35 where, as explained in connection with the system of Fig. 1, it flows either through the pipe 34 into the receiver 31 or through pipe 36 to the pump 37 by which it is forced to the expansion valve 43 and in this system, as in the system of Fig. 1, equilibrium is soon established between the action of the heat exchangers 49 and 68.

The valves 51, 30, 86, 89 and 311 are closed under this condition of operation.

Condition B—Fig. 2

When the refrigerating mechanism is to be operated to supply refrigerant only to the heat exchanger 49, the valve 41 is opened as well as the valve 308 and the valve 51 is closed. The valve 59 is opened as well as the valve 30. The valves 51, 70, 89, 86, 73, 82 and 311 are closed.

With the valves arranged in this manner refrigerant may flow from the receiver 31 through opened valves 308 and 41 into the heat exchanger 49 under the control of the expansion valve 43 which operates in the usual way to control refrigeration in the heat exchanger. The refrigerant returns through opened valve 59 to the compressor C2 from whence it flows through the condenser 29 and past opened valve 30 into the receiver 31. The heat exchanger 68 is isolated from the system because the valves 73 and 70 are closed and no refrigerant flows into the boiler B because the valve 311 is closed.

Condition C—Fig. 2

When the refrigerating mechanism is to be operated not only to supply refrigerant to the heat exchanger 49 but also to the heat exchanger 68 so as to freeze water in the tank 63, the valves 70 and 73 are opened in addition to the valves which are opened under Condition B, the other valves closed under Condition B remaining closed. Therefore, refrigeration is effected in the heat exchanger 68 as well as in the heat exchanger 49.

Condition D—Fig. 2

When refrigerant is to be supplied to the heat exchanger 68 but not to the heat exchanger 49, the valves 308 and 41 are closed as well as the valve 51 and this shuts off the supply of liquid refrigerant to the heat exchanger 49. The other valves are arranged as under Conditions B and C and refrigerant is circulated only through the heat exchanger 68.

Condition E—Fig. 2

When the car stops or moves so slowly that operation of the compressor C2 is interrupted and refrigeration of air flow over the heat exchanger 49 is to be continued, the ice stored in the tank 63 is utilized to condense the refrigerant vaporized in the heat exchanger 49 and the system is operated the same as it is operated under Condition A.

Condition F—Fig. 2

When the heat exchanger 49 is to function as a heater the system is arranged as follows: Valve 89 is operated by a thermostat responsive to the temperature of air leaving the heat exchanger and steam or other heating medium is supplied to the heating parts of the boiler B which vaporizes refrigerant supplied to the boiler through the pipe 310 past opened valve 311. The vaporized refrigerant flows through pipe 85a past opened valve 86, fitting 56, pipe 55, back pressure valve 53, pipe 52 into the heat exchanger 49. The refrigerant then flows out pipe 48 to fitting 47 from whence it passes through pipe 50 past opened valve 51 to pipe 39 through opened valve 41 to fitting 309. Valve 308 is closed at this time to prevent the flow of refrigerant to the receiver 31. The valves 30, 59, 70, 73 and 82 are closed and isolate the heat exchanger 68 from the system.

In event the supply of refrigerant in the boiler B is insufficient, the liquid level control 312 becomes operative and closes the circuit to the solenoid of the valve 308 and to the motor 38 whereupon the pump 37 is operated to withdraw liquid from the receiver 31 and force it into the boiler B.

In event the refrigerant level is too high in the boiler B, the liquid level control 312 again operates but under this condition of operation only the solenoid of the valve 308 is energized, and when this valve opens liquid refrigerant drains from the boiler B back into the receiver 31 since the boiler is mounted at a higher level than the receiver.

Condition G—Fig. 2

In event a car equipped with the system shown in Fig. 2 is to be run from a cold climate into a warm climate, it is desirable to accumulate energy so that when the car enters the warm climate refrigeration of air flowing over the heat exchanger 49 may be immediately effected even if the car is at rest, and it is desirable under these conditions to operate the system to supply vaporized refrigerant to the heat exchanger 49 as under Condition F and to supply liquid refrigerant to the heat exchanger 68 as under Condition D and to this end the valves are arranged as under Condition F except that the valves 30, 70 and 73 are opened.

The compressor C2 is set in operation and vaporized refrigerant is withdrawn from the heat exchanger 68 through pipe 69 past opened valve 70 to the fitting 58, closed valve 59 preventing flow through the pipe 57. From the fitting 58 the refrigerant returns to the compressor C2 from whence it is discharged into the condenser 29 and refrigerant liquefied in the condenser flows into the receiver 31. The valve 308 remains closed except when refrigerant is to be supplied to or withdrawn from the boiler B as under Condition F, but since this functioning of the valve 308 will rarely be necessary satisfactory operation of both heating the car and refrigerating the tank 63 may be carried out simultaneously.

In event the system shown in Fig. 2 is to be used only for refrigerating air flowing over the heat exchanger 49, the boiler B could be eliminated and, of course, the means for supplying heat thereto and the pipe 85a and the valve 86 could be eliminated and an elbow would be substituted for the T-fitting 56. Furthermore, the pipe 310 and the valve 311 therein as well as the fitting 309 and the valve 308 could be eliminated and in this event the pipe 39 would be directly connected to the pump 37 as in Fig. 1.

A control system such as that shown in Fig. 17 can be provided for the system shown in Fig. 2 or, as explained in connection with the system of Fig. 1, another type of control system may be used. By referring to the system shown in Fig. 17, I believe it will be apparent that by the use of relays such as those disclosed therein the described operation of the valves of the system of Fig. 2 under the various conditions of operation can be brought about automatically as is done by the control system of Fig. 17.

The form of air refrigerating and heating system shown in Fig. 4 is much like that shown in Figs. 1 and 2 but in place of providing a heating coil in the receiver as is done in the system of Fig. 1 or a boiler B as is done in the system of Fig. 2 the ice tank is utilized as a means for vaporizing the refrigerant for heating purposes. This system like the system of Fig. 1 cannot operate under Condition G.

In Fig. 4 the pipe 85 and the valve 86 are omitted inasmuch as the pipe 69a serves in this instance to supply vaporized refrigerant for heating purposes to the pipe 55.

A solenoid valve 313 is provided in the pipe 36a which interconnects the fitting 35 with the pump 37. Furthermore, a pipe 307 leads from the pump 37, as in the system of Fig. 2, to a fitting 309. The pipe 39 is connected to the fitting 309 and leads to the expansion valve 43 and has valves 41 and 308a therein. A pipe 310a leads from the fitting 309 to a fitting 314 and has a valve 311a therein. A pipe 80a leads from the fitting 79 to the fitting 314. A pipe 315 connects the fitting 314 to the heat exchanger 68 in the tank 63a. The pipe 69a leads from the heat exchanger 68 to a fitting 56a to which the pipe 55 is connected, and the valve 70 is provided in the pipe 69a. A pipe 60a leads from the fitting 56a to the strainer 61 for in this form of the invention the fitting 58 and the pipe 60 are not required. The valve 59 is provided in the pipe 60a.

The steam supply pipe 88 having the temperature responsive valve 89 therein leads directly into the tank 63a and a pipe 90a leads from the tank 63 and affords a steam discharge, this pipe having the usual steam trap 91 therein. However, a solenoid valve 316 is provided in the pipe 90a ahead of the steam trap 91. The water supply pipe 64 leads into the tank 63a and has a solenoid valve 65a therein. A liquid level control 312a is provided in association with the tank 63a and is connected to the fitting 314 and a fitting 317 in the pipe 69a adjacent the heat exchanger 68.

The operation of the system shown in Fig. 4 under the various conditions of operation is as follows:

Condition A—Fig. 4

The solenoid valve 316 is opened to drain water from the tank 63a and after the tank is drained this valve is closed. The tank 63a is then filled with cracked ice as under Condition A in the systems shown in Figs. 1 and 2.

Liquid refrigerant admitted into the heat exchanger 49 under control of the expansion valve 43 is vaporized in the heat exchanger 49 and flows back through pipe 52, back pressure valve 53 and pipe 55 to fitting 56a. Valve 59 is closed so that the vaporized refrigerant is prevented from flowing through the pipe 60a to the compressor C2. However, the valve 70 is opened and the refrigerant flows through pipe 69a to the heat exchanger 68 wherein it is liquefied. The liquid refrigerant flows through pipe 315 to fitting 314 but flow through pipe 310a is prevented by closed valve 311a. From fitting 314 the liquid refrigerant flows through pipe 80a to fitting 79 and it is then by-passed about the expansion valve 75 through pipe 81 past opened valve 82 to fitting 72 from whence it flows through pipe 71 past opened valve 73 to the fitting 35. The liquid refrigerant may return to the receiver 31 through pipe 34 or it will flow through pipe 36a past opened valve 313 to the pump 37, the refrigerant dividing at fitting 35 in the manner set forth more fully in the description of the system shown in Fig. 1 when operating under Condition A. Liquid refrigerant flowing to the pump 37 is forced by the pump through pipe 307, fitting 309 and through pipe 39 to expansion valve 43 past opened valves 308a and 41. In addition to the valves 59 and 311a, the valves 51, 30, 89, 65a and 316 are closed under this condition of operation.

Condition B—Fig. 4

When refrigerant is to be supplied only to the heat exchanger 49, the valves 313, 308a and 41 are opened so that liquid refrigerant may flow from the receiver 31 to the heat exchanger 49 under control of the expansion valve 43. Refrigerant vaporized in the heat exchanger 49 is returned through pipe 52, back pressure valve 53 and pipe 55 to fitting 56a. The valve 70 is closed so that the vaporized refrigerant is prevented from flowing through pipe 69a but valve 59 is open so that the refrigerant can be drawn through the pipe 60a by the compressor C2. Compressor C2 forces the refrigerant to the condenser 29 and past the opened valve 30 into the receiver 31. The valves 51, 73, 82 and 311a are closed so that liquid refrigerant cannot flow to the heat exchanger 68, and the valves 89, 65a and 316 are also closed.

Condition C—Fig. 4

When refrigerant is to be supplied to the heat exchanger 68 to freeze water in the tank 63a, it is first ascertained whether or not there is a sufficient supply of water in the tank and if not the valve 65a is opened to fill the tank 63a up to the level of the overflow device 66. Then the valves which were opened under Condition B are opened and also the valves 73 and 70 are opened so that liquid refrigerant may flow to the heat exchanger 68 through the opened valve 73 under control of the expansion valve 75 and so that refrigerant vaporized in the heat exchanger 68 may be returned through the pipe 69a past opened valve 70 to the fitting 56a from whence the refrigerant is drawn through pipe 60a by the compressor C2. The valves other than the valves 73 and 70 which were closed when the system shown in Fig. 4 was operating under Condition B remain closed when the system is operated under Condition C.

Condition D—Fig. 4

When liquid refrigerant is to be supplied only to the heat exchanger 68, the valves 308a and 41 are closed. The other valves are arranged in the same manner as the valves are arranged when the system is operating under Condition C, and since the supply of liquid refrigerant to the heat exchanger 49 is shut off by closing the valves 308a and 41, liquid refrigerant is supplied only to the heat exchanger 68.

Condition E—Fig. 4

When the car stops or moves so slowly that operation of the compressor C2 is interrupted and refrigeration of air flow over the heat exchanger 49 is to be continued, the ice stored in the tank 63 is utilized to condense the refrigerant vaporized in the heat exchanger 49 and the system is operated the same as it is operated under Condition A.

Condition F—Fig. 4

When the system shown in Fig. 4 is to be operated to supply vaporized refrigerant to the heat exchanger 49 for the purpose of heating air flowing over this heat exchanger, the valves 59, 30, 313, 73 and 82 are closed. The valves 70, 51, 41, 308a and 311a are opened. The temperature responsive valve 89 operates to supply steam, as required, into the tank 63a and the valve 316 operates to permit water accumulated in the tank 63 to be discharged therefrom. The valve 65a remains closed at this time to shut off water from the tank 63a. Steam admitted into the tank 63a vaporizes the refrigerant in the heat exchanger 68 and this heated fluid circulates through the heat exchanger 49 to heat air flowing over this heat exchanger, and in event the liquid level in the heat exchanger 68 falls the liquid level device 312a operates to open the valve 313 and start the motor 38 so that the pump 37 may withdraw refrigerant from the receiver 31 through pipe 34, fitting 35 and pipe 36a and the liquid refrigerant so withdrawn is forced through pipe 307, fitting 309, pipe 310a, fitting 314, pipe 315 to the heat exchanger 68. If the liquid refrigerant in the heat exchanger rises, the liquid level device 312a or the like opens the valve 313 so that the liquid may drain back into the receiver 31 inasmuch as the tank 63a is mounted at a higher level than the receiver 31.

If the system shown in Fig. 4 was to be used only for refrigerating air flowing over the heat exchanger 49, the valves 51, 59, 308a, 313 and 311a could be eliminated as well as pipe 310a and the fittings provided for connecting this pipe. Moreover, a manual valve could be used in place of the solenoid valve 65a.

In Figs. 5, 6, 9 and 10 a multi-cylinder compressor C3 is illustrated which can be substituted for the compressor C2 in the systems illustrated in Figs. 1, 2 and 4. If this substitution is made it is not necessary to change the connections to the high pressure side of the compressor for insofar as the high pressure connections are concerned the compressors are interchangeable. However, the low pressure connections of the compressors must be changed in the manner now to be described.

When the compressor C3 is substituted for the compressor C2 in the system shown in Fig. 1, the low pressure or suction connections are made as shown in Fig. 5. The pipe 60b is connected to the fitting 56 instead of the pipe 57 and this pipe 60b leads to a strainer 61a similar to the strainer 61. The valve 59 is provided in the pipe 60b. The pipe 85 leads to the T-fitting 33 just as is done in Fig. 1. The pipe 62a leads from the strainer 61a to a solenoid valve 318 and fittings 319 are provided in the pipe 62a to which the inlets 320 (Fig. 6) to the first three cylinders of the compressor C3 are respectively connected.

The pipe 69 leads from the heat exchanger 68 to a coupling 321 to which a pipe 60c is connected that leads to a strainer 61b. A pipe 62b leads from the strainer 61b to the solenoid valve 318 and a fitting 319a is provided therein to which the inlet 320a of the fourth cylinder of the compressor is connected.

When the compressor C3 is substituted for the compressor C2 in the system shown in Fig. 2, the high pressure connections of the compressor are the same as shown in Fig. 2 but the pipe 60b is connected to the fitting 56 and the valve 59 is provided therein. The pipe 69 again leads from the heat exchanger 68 to the coupling 321 and the pipe 60c leads from the coupling 321 to the strainer 61b. The connections between the strainers 61a and 61b are the same as in Fig. 5. In this instance the pipe 55a is connected to the boiler B just as this pipe is connected in the system shown in Fig. 2.

Figure 10:
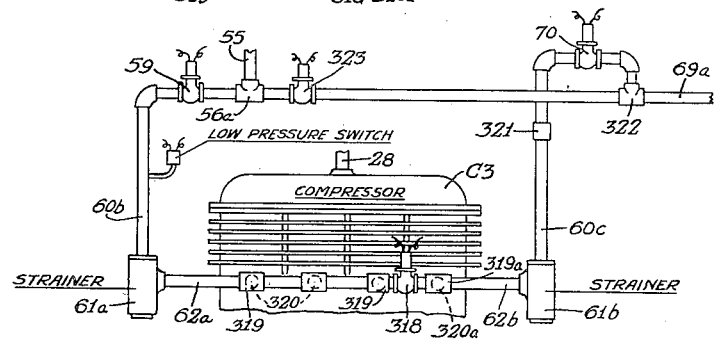
Fig. 10 is a view of a multi-cylinder compressor connected for use in the system shown in Fig. 4.

When the compressor C3 is substituted for the compressor C2 in the system shown in Fig. 4, the high pressure connections are the same as those described for the system shown in Fig. 4. However, the low pressure connections are made as shown in Fig. 10, that is to say, the pipe 60b is connected to the fitting 56a and the valve 59 is provided therein. The pipe 69a in this instance leads from the heat exchanger 68 and is connected to the fitting 56a and the valve 70a is provided therein. Furthermore, a T-fitting 322 is provided in the pipe 69a and the pipe 60c is connected to this T-fitting 322 and leads to the strainer 61b. A solenoid valve 323 is provided in the pipe 60c in this instance. The connections between the strainers 61a and 61b are the same as those provided in the arrangement of Fig. 5.

The multiple cylinder compressor shown in Figs. 5, 9 and 10 operate substantially the same as the compressors shown in Figs. 1, 2 and 4 under the various conditions of operation. All of the various valves in the systems shown in Figs. 1, 2 and 4 operate under the various conditions of operation in the same manner as that which has been described except the valves 59 and 70. Furthermore, when the multiple cylinder compressor is used, some additional valves are provided, and the operation of the valves 59 and 70 and the additional valves under the various conditions of operation when the multiple cylinder compressor C3 is substituted for the compressor C2 in the systems shown in Figs. 1, 2 and 4 will now be described.

Condition A—Multiple cylinder compressor

When the compressor C3 is used in the system of Fig. 1 in the manner shown in Fig. 5, the valve 59 is open under Condition A and vaporized refrigerant leads through pipe 55 past opened valve 59 and through pipe 60b to the strainer 61a and thence through pipe 62a, opened solenoid valve 318, pipe 62b, strainer 61b, pipe 60c, coupling 321 and through pipe 69 past opened valve 70.

Likewise, when the compressor C3 is substituted for the compressor C2 in the system shown in Fig. 2, vaporized refrigerant returns through pipe 55 to fitting 56 from whence it flows through pipe 60b past opened valve 59, through strainer 61a, pipe 62a, opened valve 318, pipe 62b, strainer 61b, pipe 60c, coupling 321 and through pipe 69 past opened valve 70.

When the compressor C3 is substituted for the compressor C2 in the system shown in Fig. 4, vapor refrigerant returning through pipe 55 under Condition A flows to fitting 56a but preferably the valve 59 is closed as well as the valves 318 and 70 but the vaporized refrigerant may return to the heat exchanger 68 through pipe 69a by opening valve 323.

*Condition B—Multiple cylinder compressor*

When the multiple cylinder compressor C3 is substituted for the compressors C2 used in the systems shown in Figs. 1, 2 and 4, all four cylinders thereof may be utilized under Condition B inasmuch as the heat exchanger 68 is not operating as an evaporator under this condition. Therefore, the valves 70 will be closed in each of the arrangements shown in Figs. 5, 9 and 10 but the valves 318 will be open. The vaporized refrigerant returning from the heat exchanger 49 will flow through pipe 55 into fittings 56 or 56a and through pipes 60b past opened valves 59 and into the pipe 62a and 62b. In the system as shown in Fig. 10 the valve 323 will be closed under this condition of operation.

*Condition C—Multiple cylinder compressor*

When the multiple cylinder compressor C3 is substituted for the compressor C2 used in the systems shown in Figs. 1, 2 and 4, the operation of the compressor C3 is quite different from the operation of the compressor C2, for the first three cylinders of the compressor C3 withdraw vaporized refrigerant from the heat exchanger 49 while the fourth cylinder of the compressor withdraws vaporized refrigerant from the heat exchanger 68.

Therefore, in the systems as shown in Figs. 5, 9 and 10 both the valves 59 and 70 are opened but the valves 318 are closed. Under this condition of operation the valve 323 shown in Fig. 10 is closed.

Then in the system shown in Fig. 5 vaporized refrigerant from the heat exchanger 49 flows through pipe 55, fitting 56, past opened valve 59 to flow through the inlets 320 and refrigerant from the heat exchanger 68 flows through pipe 69 past opened valve 70 into pipe 60c and through the inlet 320a.

In the system shown in Fig. 9, vaporized refrigerant returns from the heat exchanger 49 through pipe 55 past opened valve 59 to flow through the inlets 320, and refrigerant from the heat exchanger 68 flows through pipe 69 past opened valve 70 to the inlet 320a.

In the system shown in Fig. 10, vaporized refrigerant returns through pipe 55 past opened valve 59 to the inlets 320 and refrigerant from the heat exchanger 68 flows through pipe 69a to T-fitting 322 from whence it flows through pipe 60c past opened valve 70 to the inlet 320a.

It will be noted that it is imperative that the valve 318 remain closed during this condition of operation. Furthermore, when a multiple cylinder compressor is used in the manner shown in Figs. 5, 9 and 10, the back pressure valve 53 may be eliminated because the first three cylinders of the compressor withdraw thermic fluid from the heat exchanger 49 while the fourth cylinder withdraws thermic fluid from the heat exchanger 68, and since these heat exchangers are subjected to independent suction effects there will be no tendency to equalize the saturation pressures therein.

*Condition D—Multiple cylinder compressor*

Under this condition of operation since no refrigerant is returning from the heat exchanger 49, the valves 59 will be closed in the systems as shown in Figs. 5, 9 and 10. However, the valves 70 are opened in the systems shown in these three figures so that refrigerant returning from the heat exchanger 68 may be drawn into the compressor and in this instance the valves 318 are opened so that the refrigerant is not only drawn through the inlet 320a but also through the inlets 320. The valve 323 in the system shown in Fig. 10 is, of course, closed at this time.

*Condition E—Multiple cylinder compressor*

When the systems shown in Figs. 1, 2 and 3 include the compressor C3 in place of the compressor C2, the systems operate precisely as described under Condition A, multiple cylinder compressor.

*Condition F—Multiple cylinder compressor*

When the system as shown in Fig. 5 is included in the system shown in Fig. 1 and this system is operated for heating, the valves 59, 318 and 70 are closed and vaporized refrigerant flows from the receiver 31 through the pipe 32 to fitting 33 past opened valve 86 into pipe 85 to fitting 56 and thence through pipe 5, the remainder of the operation being the same as described under Condition F, Fig. 1.

When the system shown in Fig. 9 is included in the system shown in Fig. 2, the valves 59, 318 and 70 are closed and vaporized refrigerant flows from the boiler B into the pipe 85a past opened valve 86 to fitting 56 and thence through pipe 55, and the remainder of the system operates as described under Condition F, Fig. 2.

When the system shown in Fig. 10 is included in the system shown in Fig. 4, the valves 59, 318 and 70 are closed so that vaporized refrigerant flowing through the pipe 69a may flow past opened valve 323 to fitting 56a from whence the vaporized refrigerant flows through pipe 55, and the system operates as described under Condition F, Fig. 4.

*Condition G—Multiple cylinder compressor*

Only the system shown in Fig. 9 can be used to accomplish this condition and the system shown in Fig. 9 is incorporated in the system shown in Fig. 2 for this purpose. Under this condition of operation since vaporized refrigerant is to flow through thhe pipe 85a from the boiler B, the valve 86 is opened and the vaporized refrigerant flows into the pipe 55. However, the valve 59 is closed but the valves 318 and 70 are opened and the vaporized refrigerant returning from the heat exchanger 68 through pipe 69 can therefore flow through the inlets 320 as well as the inlet 320a. The remainder of this system operates precisely as described under Condition G, Fig. 2.

In Figs. 7, 8, 11 and 12 a multiple effect compressor C4 is shown which can be substituted for the compressor C2 in the systems shown in Figs. 1, 2 and 4 in the same manner as that in which the compressor C3 was substituted for these compressors. This multiple effect compressor has strainers 61c and 61d associated therewith which correspond to the strainers 61a and 61b provided on the compressor C3. However, in this instance the pipe 62d leads from the strainer 61d to a T-fitting 324 provided in the pipe 62c which leads from the strainer 61c. A T-fitting 325 is provided in the pipe 62d and the inlet 326 of the compressor C4 leading from the crank case of the compressor is connected to this T-fitting. A solenoid valve 318a, similar to solenoid valve 318, is provided in the pipe 62d between the T-fittings 324 and 325. The pipes 62c have fittings 327 therein to which the inlets 328 of the compressors C4 are connected and these inlets communicate with the cylinders above the lowermost position of the pistons P of the compressors C4. The skirts of the pistons P are of sufficient length that when the pistons attain their uppermost positions they close off the inlets 328 so that there is no communication between these inlets and the crank cases of the compressors.

The temperature maintained in the heat exchanger 49 is considerably higher than that maintained in the heat exchanger 68 when these heat exchangers are serving as evaporators. Hence, the saturation pressure in the heat exchanger 49 is much higher than in the heat exchanger 68. A valve V is provided in the head of the piston P, and when this piston starts downwardly from its uppermost position the pressure of refrigerant in the crank case of the compressor which is supplied thereto from the heat exchanger 68 opens the valve V and the low pressure refrigerant in the crank case of the compressor is therefore admitted into the cylinder above piston P. However, just prior to the time the piston reaches its lowermost position the inlet 328 is disclosed. Refrigerant is supplied to the inlet 328 from the heat exchanger 49 and this refrigerant is at a much higher pressure than that which is in the crank case and therefore as soon as the inlet 328 is disclosed this high pressure refrigerant rushes into the cylinder above the piston P, closing the valve V, and thereafter the piston P starts to ascend and compresses the gas confined in the cylinder thereabove which is discharged through the pipe 28.

Figure 11:
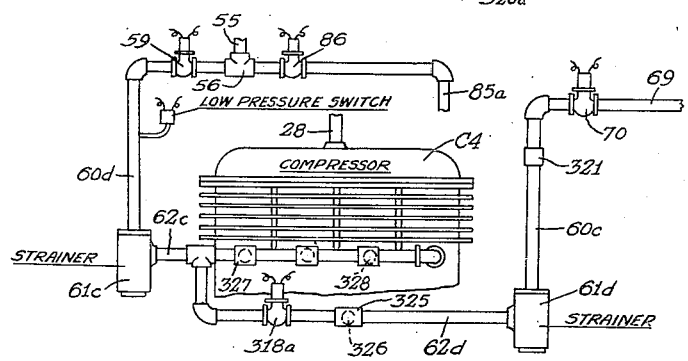
Fig. 11 is a view of a multiple effect compressor connected for use in the system shown in Fig. 2.
Figure 12:
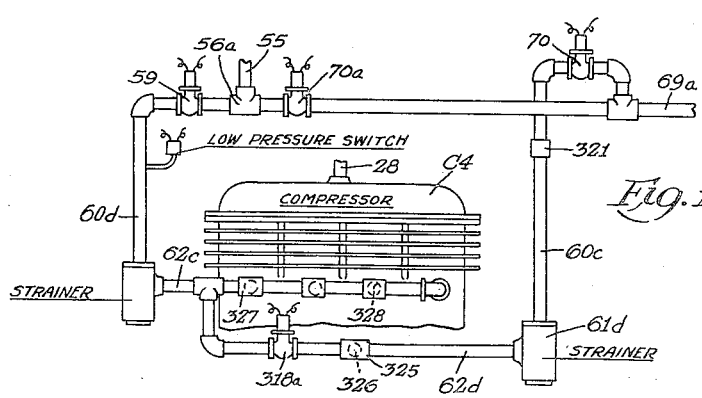
Fig. 12 is a view of a multiple effect compressor connected for use in the system shown in Fig. 4.

By a comparison of Figs. 7, 11 and 12 with Figs. 9, 10 and 11 it will be noted that the pipe connections to the compressors C4 and the valves arranged therein are the same as the pipe connections and the valves therein to the compressors C3. Therefore, under the various conditions of operation the systems shown in Figs. 7, 11 and 12 are connected precisely in the manner described for the systems shown in Figs. 5, 9 and 10. Moreover, as explained in connection with the multiple cylinder compressor, the back pressure valve 53 may be eliminated when a multiple effect compressor is used.

The form of the invention illustrated in Figs. 13, 14 and 15 operates under the well-known Kelvin reverse cycle refrigeration principle when the heat exchanger 49 is to be used as a heater but otherwise operates as an ordinary refrigerating mechanism. In the form of the invention shown in Fig. 13, a compressor of the usual type such as the compressor C2 is employed. In the form of the invention shown in Fig. 14, a multiple cylinder compressor like the compressor C3 is employed. And in the form of the invention shown in Fig. 15, a multiple effect compressor like the compressor C4 is employed.

In this form of the invention the discharge pipe 28a of the compressor C2 leads to a T-fitting 330. The pipe 331 leads from the T-fitting 330 to a three-way valve 332. The pipe 333 leads from the three-way valve to a heat exchanger 29a. A valve 30a is provided in the outlet of the heat exchanger 29a, which outlet leads to a T-fitting 334. The pipe 335 leads from the T-fitting 334 to a T-fitting 336 and has a solenoid valve 347 therein. A pipe 337 leads from the T-fitting 336 to an expansion valve 338 and a pipe 339 interconnects the expansion valve and the T-fitting 334. A pipe 340 leads from the T-fitting 336 into a receiver 31a. Pipe 34a leads from the receiver 31a to a T-fitting 35a. A pipe 36a leads from the T-fitting 35 to the pump 37a which is operated by a motor 38a. The pipe 39 is connected to the discharge of the pump 37a to the expansion valve 43 and this part of the apparatus is arranged in the manner illustrated in Fig. 1. The pipe 55 leads to a T-fitting 56c and a pipe 341 leads from the fitting 56c to a three-way valve 342. A pipe 343 leads from the fitting 342 to a strainer 344. Another pipe 345 connects the strainer 344 with the three-way valve 332. A pipe 346 connects the T-fitting 330 with the three-way valve 342. The pipe 69c having the solenoid valve 70c therein, leads from the fitting 56c to a heat exchanger 68c in the ice tank 63c. The inlet pipe 80a from the heat exchanger 68c leads to a T-fitting 79a. A pipe 78a leads from the fitting 79a to an expansion valve 75a and a pipe 74a leads from the expansion valve 75a to a T-fitting 72a. A dehydrator 77a and a strainer 76a are provided in the pipe 74a. A pipe 81a interconnects the T-fittings 79a and 72a and has a solenoid valve 82a therein. A pipe 71a leads from the T-fitting 72a to the T-fitting 35a and has a solenoid valve 73 therein.

The system shown in Fig. 13 operates under the various conditions of operation as follows:

Condition A—Fig. 13

The ice tank 63c is filled with cracked ice and the valves 347, 30a and 51 are closed. Refrigerant vaporized in the heat exchanger 49 returns through pipe 55 past opened valve 70c through pipe 69c to heat exchanger 68c where it is condensed, and liquid refrigerant flows through pipe 80a to fitting 79a from whence it is by-passed about the expansion valve 75a past opened valve 82a. From fitting 72a the refrigerant may flow through pipe 71a past opened valve 73a to fitting 35a whereat it divides to either flow through the pipe 34a or pipe 36a, and refrigerant flowing through the pipe 36a flows through the pump 37a into the pipe 39 from whence it flows to the heat exchanger 49 under control of the expansion valve 43. The division of the refrigerant at the fitting 35a corresponds to the division at the fitting 35 as described under Condition A, Fig. 1.

Condition B—Fig. 13

Under this condition of operation the valves 73a, 82a, 70c and 51 are closed and refrigerant flows from the compressor C2 through pipe 28a to fitting 330 through pipe 331 to the three-way valve 332. Valves 30 and 347 are opened.

A valve like the three-way valve 332 is shown in Fig. 16. As there illustrated flow from the pipe 331 is directed to a valve seat 350. Flow to the pipe 333 through the valve is possible when the valve member 351 is disengaged from the valve seat 350 at which time it will be engaged with the valve seat 352 as shown in Fig. 16. The valve is solenoid operated and the valve member 351 can be retracted from engagement with the valve seat 352 and engaged with the valve seat 350.

Under the present condition of operation, the valve 332 is arranged as shown in Fig. 16 and therefore refrigerant may flow therefrom into the pipe 333 and the condenser 29a.

Condition C—Fig. 13

Under this condition of operation the parts are arranged the same as under Condition B, Fig. 13, except that the valve 70c and the valve 73a are opened and the refrigerant is supplied to the heat exchanger 68c which operates in the manner described under Condition A, Fig. 1.

Condition D—Fig. 13

When refrigerant is to be supplied only to the heat exchanger 68c and not to the heat exchanger 49, the valves 41 and 51 are kept closed but the other valves are arranged as under Conditions B and C, Fig. 13, and therefore refrigerant is only supplied to the heat exchanger 68c but refrigerant is withdrawn from both this heat exchanger and the heat exchanger 49.

Condition E—Fig. 13

Under this condition of operation the parts are arranged the same as under Condition A, Fig. 13, and ice which has been accumulated in the tank 63c is utilized for condensing vaporized refrigerant returning from the heat exchanger 49.

Condition F—Fig. 13

Under this condition of operation the heat exchanger 29a operates as an evaporator and therefore vaporized refrigerant is supplied to the heat exchanger 49 from the compressor C2. Hence, refrigerant flows from the compressor through the pipe 28a to the fitting 330. The valve 332 is positioned to interconnect the pipes 333 and 345 and therefore refrigerant does not flow through the pipe 331. The valve 342 is arranged to interconnect the pipes 346 and 341 but the pipe 343 is disconnected from both the pipes 346 and 341. Therefore the refrigerant flows from the fitting 330 through pipe 346, valve 342, pipe 341, fitting 56c and through pipe 55 to the heat exchanger 49 from whence it flows through the pipe 50 past opened valve 51 to be by-passed about the expansion valve 43, and the refrigerant flows from the pipe 50 past opened valve 41 through pipe 39, pump 37a, pipe 36a to fitting 35a. The valves 73a and 70c are closed to isolate the heat exchanger 68c and the parts associated therewith from the system. From the fitting 35a the refrigerant flows through pipe 34a to receiver 31a and out through pipe 340 to fitting 336. Valve 347 is closed and therefore refrigerant flows from fitting 336 through pipe 337 through the expansion valve 338 and pipe 339 past opened valve 30a to the heat exchanger 29a, the expansion valve 338 operating in the well understood manner to supply liquid refrigerant to the heat exchanger 29a. Refrigerant vaporized in the heat exchanger 29a returns to the compressor C2 through pipe 333, valve 332, pipe 345 and strainer 344.

Condition G—Fig. 13

The system shown in Fig. 13 is not capable of operating under this condition of operation.

In Fig. 14 a multi-cylinder compressor like that shown in Fig. 5 is illustrated and herein the manner in which this compressor is connected for use in the system shown in Fig. 13 is illustrated. Likewise, in Fig. 15 a multiple effect compressor like that shown in Fig. 7 is illustrated and the manner in which this compressor would be connected for use in the system shown in Fig. 13 is illustrated herein.

In both the systems shown in Figs. 14 and 15 the pipe 28a leads from the compressor to a fitting 330a from whence a pipe 346a leads to a three-way valve 342a. Pipe 341a leads from the valve 342a to an elbow which directly connects the pipe 341a to the pipe 55. In Fig. 14 the pipe 343a leads from the valve 342a to a strainer 344a whereas in Fig. 15 this pipe leads to a strainer 344c.

The pipe 331a leads from the fitting 330a to the three-way valve 332a and the pipe 333 leads from the valve to the heat exchanger 29a just as in Fig. 13, the parts not shown in Figs. 14 and 15 being identical with the parts shown in Fig. 13. A pipe 345a leads from the valve 332a to a T-fitting 360 in the pipe 343a.

The pipe 69d from the heat exchanger 68c in Fig. 14 leads to a strainer 344b and in Fig. 15 to a strainer 344d.

In Fig. 14 a pipe 361 leads from the strainer 344 to a solenoid valve 363 and the inlets 362 of the first three cylinders of the compressor C3 are connected to fittings in this pipe. A pipe 364 leads from the strainer 344b to the valve 363 and has a fitting 365 therein to which the inlet 366 of the fourth cylinder of the compressor C3 is connected.

In Fig. 15 a pipe 361a leads from the strainer 344c and inlets 362a lead into the cylinders of the compressor C4. A pipe 364a leads from the strainer 344d to a T-fitting 369 in the pipe 361a. A fitting 367 is provided in this pipe to which an inlet 368 leading into the crank case of the compressor C4 is connected. A solenoid valve 363a is provided in the pipe 364a between the fitting 367 and the T-fitting 369.

Condition A—Figs. 14 and 15

The ice tank 63c is filled with cracked ice and vaporized refrigerant from the heat exchanger 49 flows through pipe 55 into pipe 341a. The valve 342a interconnects the pipe 341a and 343a and the vaporized refrigerant flows to the strainer 344a in Fig. 14 and to the strainer 344c in Fig. 15. In Fig. 14 the refrigerant flows through pipes 361 and 364 past opened valve 363 to strainer 344b. In Fig. 15 the refrigerant flows from strainer 344c through pipe 361a, T-fitting 369, pipe 364a past opened valve 363a to strainer 344d. From the strainers 344b and 344d the liquid refrigerant flows to the heat exchanger 68c through pipe 69d past opened valve 70c.

Refrigerant liquefied in the heat exchanger 68c flows to the heat exchanger 49 in the manner described under Condition A, Fig. 13.

Condition B—Figs. 14 and 15

Under this condition refrigerant flows from the compressors through pipe 28a to fitting 330a. The valve 342a interconnects the pipes 341a and 343a and therefore there is no flow through pipe 346a. From the fitting 330a the refrigerant flows through pipe 331a and valve 332 into pipe 333 and heat exchanger 29a from whence refrigerant flows to the heat exchanger 49 in the manner described under Condition B, Fig. 13. The pipe 345a is disconnected from both the pipes 331a and 333. Vaporized refrigerant returns from the heat exchanger through pipes 55, 341a and 343a. In Fig. 14 refrigerant flows from the strainer 344a through the pipes 361 and 364, the valve 363 being opened under this condition and the returning refrigerant being admitted into all four cylinders. The valve 70c will be closed.

In Fig. 15 the refrigerant flows from the strainer 344c through pipe 361a and inlets 362a into the cylinders of the compressor C4 and it also flows through the pipe 364a and inlet 368 into the crank case of the compressor, the valve 363a being open under this condition. The valve 70c will be closed.

Condition C—Figs. 14 and 15

When the system shown in Fig. 14 is to operate under this condition, the valve 363 is closed and the first three cylinders of the compressor C3 withdraw refrigerant from the heat exchanger 49, liquid refrigerant being supplied to this heat exchanger as described under Condition B, Fig. 13. The fourth cylinder of the compressor withdraws refrigerant from evaporator 68c admitted thereto past opened valve 73a in the manner described under Condition C, Fig. 13.

When the compressor shown in Fig. 15 is to be operated under this condition, the valve 363a is closed. High pressure gas withdrawn from the heat exchanger 49 is therefore admitted into the cylinders of the compressor C4. Low pressure gas returning from the heat exchanger 68c is admitted into the crank case of the compressor C4 and this compressor operates in the manner previously described for a multiple effect compressor.

Condition D—Figs. 14 and 15

When refrigerant is to be supplied only to the heat exchanger 68c, the valve 41 is closed and therefore liquid refrigerant cannot flow into the heat exchanger 49. The other valves remain open as under Condition C, Figs. 14 and 15, except that the valve 363a is opened so that refrigerant may flow into the cylinders and crank case of the compressor C4.

Condition E—Figs. 14 and 15

Under this condition the systems shown in Figs. 14 and 15 operate the same as under Condition A, Figs. 14 and 15.

Condition F—Figs. 14 and 15

Under this condition of operation the heat exchanger 68c is isolated from the system and therefore the valves 70c and 73a as well as 82a are closed.

Vaporized refrigerant discharged through the pipe 28a flows to the fitting 330 but does not flow through the pipe 331a inasmuch as the valve 332a is interconnecting the pipes 333 and 345a. Hence the vaporized refrigerant flows through the pipe 346a and valve 342a to pipe 341a, valve 332a shutting off communication to pipe 343a from the pipes 346a and 341a.

Refrigerant flows from the pipe 341a through the pipe 55 and back through the pipe 39 to the receiver 31a, as described under Condition F, Fig. 13. From the receiver 31a the refrigerant flows to the heat exchanger 29a past the expansion valve 338a, the valve 347 being closed. From the heat exchanger 29a refrigerant flows through pipe 333, valve 332a and pipe 345, and pipe 343a to strainer 344a in Fig. 14 and strainer 344c in Fig. 15. In the system of Fig. 14, the valve 363 is opened so that all of the cylinders act to withdraw refrigerant from the heat exchanger 29a. In the system shown in Fig. 15, the valve 363a is opened so that vaporized refrigerant is withdrawn from the heat exchanger 29a into both the cylinders and crank case of the compressor C4.

Condition G—Figs. 14 and 15

The systems shown in Figs. 14 and 15 may be used to supply vaporized refrigerant to the heat exchanger 49 to heat air flowing thereover and at the same time to supply liquid refrigerant to the heat exchanger 68c.

The systems of Figs. 14 and 15 for this condition of operation are arranged precisely as described under Condition F, Figs. 14 and 15, except that the valve 363 in the system of Fig. 14 is closed and the valve 363a in the system of Fig. 15 is closed. Furthermore, the valves 70c and 73a are opened. The circulation to and from the heat exchanger 49 is precisely the same as that described under Condition F, Figs. 14 and 15, except that in the system of Fig. 14 only the first three cylinders of the compressor C3 withdraw refrigerant from the heat exchanger 29a and in the system of Fig. 15 refrigerant is drawn into the cylinders of the compressor C4 from the heat exchanger 29a but not into the crank case.

Liquid refrigerant is supplied to the heat exchanger 68c from the receiver 31a in the manner previously described, and in the system shown in Fig. 14 refrigerant vaporized in the heat exchanger 68c is withdrawn from this heat exchanger by the fourth cylinder of the compressor C3. In the system shown in Fig. 15 refrigerant vaporized in the heat exchanger 68c is admitted into the crank case of the compressor C4.

In the foregoing description reference has been made to supplying liquid refrigerant to the heat exchanger 49 for the purpose of cooling air flowing thereover, but as will be understood when refrigeration is effected in the heat exchanger 49 there will inevitably also be dehumidification of the air and reference to refrigerating air flowing over the heat exchanger 49, of course, includes dehumidification of the air.

Furthermore, it will be understood that an electrical control system such as that shown in Fig. 17 can be provided for any one of the systems and likewise other control systems can be used in place of an electrical control system, as has been explained.

Reference has been made herein to accumulating energy by operating the compressor condensing means to freeze water or cool liquid in the tank 63 whereby thermal means is afforded for cooling the thermic fluid or, more specifically, for condensing vaporized refrigerant returning from the heat exchanger 49. This statement may be criticized because, in a strict sense, energy is not accumulated by freezing the water or cooling liquid for energy is extracted from the water or other liquid when it is converted into ice or cooled liquid; but inasmuch as I utilize this ice or cooled liquid for performing work, that is to say, condensing vaporized refrigerant returning from the heat exchanger 49, I believe it is proper to refer to the freezing of the water or the cooling of the liquid in the ice tank 63 as the accumulation of energy.

Furthermore, it is to be understood that the compressor-condenser arrangement could be omitted and the refrigerant could be circulated through a tank like the tank 63 which would be filled with ice or cooled liquid, such as a brine solution, and the system would operate satisfactorily, the ice supply or cooled liquid being manually replenished from time to time. Under this condition of operation a pump would be provided for supplying the thermic fluid to the heat exchanger. Furthermore, such a system could be used for heating purposes and this could be attained by providing an arrangement much like that illustrated in Fig. 4 and steam or other heating medium would be supplied to the tank which I have described as being filled with ice. When such an arrangement was used for heating no pump would need be provided for circulation although, as in the illustrated form of the invention, the pump could be included in such instance, which would be a centrifugal or bellows pump so that free circulation therethrough would be possible.

Another arrangement for heating without the use of a compressor-condenser would be to include a boiler such as that shown in Fig. 2 and to make such an arrangement adaptable for both heating and cooling, a tank for receiving ice and having a heat exchanger therein would be provided for such a system would be much like that illustrated in Fig. 2 without the compressor and condenser.

The invention is particularly advantageous for the reason that substantially the same equipment can be used for heating or cooling air supplied to a railway car or the like. Moreover, the device will function to heat or cool the air whether or not the car is in motion. Furthermore, while I have shown the various compressors as being operated from the axle other source of motive power can be provided. For example, an electric motor can be used and if this is done this motor will be controlled in the manner I have described for the magnetic clutch.

While I have illustrated and described selected embodiments of my invention it is to be understood that these are capable of variation and modification and I therefore do not wish to be limited to the precise details set forth but desire to avail myself of such changes and alterations as fall within the purview of the following claims:

I claim:

1. In an air conditioning system for a railway car or the like, a heat exchanger for affecting the temperature of air supplied to the car, means for supplying liquid refrigerant to the heat exchanger to refrigerate air flowing into the car, means for condensing refrigerant vaporized in the heat exchanger when the car is in motion, other means for condensing refrigerant vaporized in the heat exchanger when the car is at rest, and means responsive to and directly under the control of the speed of the car for selectively rendering either of said condensing means operative.

2. In a refrigerating system, a heat exchanger for reducing the temperature of a fluid thereabout, a compressor, a second heat exchanger, an ice tank having a third heat exchanger therein, a receiver, pipe means for interconnecting said heat exchangers, compressor and receiver, and valve means for controlling flow through said pipe means, heat exchangers, compressor and receiver whereby liquid refrigerant may be supplied to the first-named and third heat exchangers to be vaporized therein and refrigerant vaporized in said heat exchangers may be returned to said compressor to be condensed in the second heat exchanger or liquid refrigerant may be supplied to the first-named heat exchanger or to the third-named heat exchanger, so as in the latter case to freeze water in the said tank, throughout substantially the entire surface area of the same, into ice, or vaporized refrigerant may be supplied to the first-named heat exchanger while no refrigerant is supplied to the third heat exchanger and liquid refrigerant is supplied to the second-named heat exchanger, and means responsive to and directly under the control of the speed of the car for selectively rendering said condensing means operative.

3. In an air conditioning system for a railway car or the like, a heat exchanger for affecting the temperature of air supplied to the car, means for supplying liquid refrigerant to the heat exchanger to refrigerate air flowing into the car, compressor-condenser means for condensing refrigerant vaporized in the heat exchanger and operable when the car is in motion, thermal means for condensing refrigerant vaporized in the heat exchanger when the car is at rest, and means responsive to and directly under the control of the speed of the car for selectively directing refrigerant to said compressor-condenser means or to said thermal means.

4. In an air conditioning system for a railway car or the like, a heat exchanger for affecting the temperature of air supplied to the car, means for supplying liquid refrigerant to the heat exchanger to refrigerate air flowing into the car, compressor-condenser means, thermal means, means for directing refrigerant vaporized in said heat exchanger to said compressor-condenser means when the car is in motion to be condensed therein and for directing refrigerant vaporized in said heat exchanger to said thermal means when the car is at rest, and means responsive to and directly under the control of the speed of the car for determining operation of the directing means.

5. In an air conditioning system for a railway car or the like, a heat exchanger for affecting the temperature of air supplied to the car, means for supplying liquid refrigerant to the heat exchanger to refrigerate air flowing into the car, compressor-condenser means, thermal means, means for directing refrigerant vaporized in said heat exchanger to said compressor-condenser means when the car is in motion to be condensed therein and for directing refrigerant vaporized in said heat exchanger to said thermal means when the car is at rest, means for connecting the compressor-condenser means to the thermal means when the car is in motion to accumulate energy in said thermal means, the energy accumulated in said thermal means when the car is in motion effecting operation of said thermal means to condense vaporized refrigerant supplied thereto when the car is at rest, and means responsive to and directly under the control of the speed of the car for determining the operation of the directing means and the means for connecting the compressor-condenser means to the thermal means.

6. In an air conditioning system for a railway car or the like, a heat exchanger for affecting the temperature of air supplied to the car, means for supplying liquid refrigerant to the heat exchanger to refrigerate air flowing into the car, compressor-condenser means, thermal means, means for directing refrigerant vaporized in said heat exchanger to said compressor-condenser means when the car is in motion to be condensed therein and for directing refrigerant vaporized in said heat exchanger to said thermal means when the car is at rest, means for connecting the compressor-condenser means to the thermal means when the car is in motion to accumulate energy in said thermal means, the energy accumulated in said thermal means when the car is in motion effecting operation of said thermal means to condense vaporized refrigerant supplied thereto when the car is at rest, means for maintaining a saturation pressure in the heat exchanger higher than in the thermal means when the compressor-condenser means is condensing refrigerant vaporized in the heat exchanger and accumulating energy in the thermal means, and means responsive to the speed of the car for determining the operation of the directing means and the means for connecting the compressor-condenser means to the thermal means.

7. In an air conditioning system for a railway car or the like, a heat exchanger for affecting the temperature of air supplied to the car, means for supplying liquid refrigerant to the heat exchanger to refrigerate air flowing into the car, compressor-condenser means, thermal means, means for directing refrigerant vaporized in said heat exchanger to said compressor-condenser means when the car is in motion to be condensed therein and for directing refrigerant vaporized in said heat exchanger to said thermal means when the car is at rest, means for connecting the compressor-condenser means to the thermal means when the car is in motion to accumulate energy in said thermal means, the energy accumulated in said thermal means when the car is in motion effecting operation of said thermal means to condense vaporized refrigerant supplied thereto when the car is at rest, selectively operable means for disconnecting the compressor-condenser means from the heat exchanger or the thermal means or both when the car is in motion, and means responsive to the speed of the car for determining the operation of the directing means and the means for connecting the compressor-condenser means to the thermal means.

8. In an air conditioning system for a railway car or the like, a heat exchanger for affecting the temperature of air supplied to the car, means for supplying liquid refrigerant to the heat exchanger to refrigerate air flowing into the car, compressor-condenser means, thermal means, means for directing refrigerant vaporized in said heat exchanger to said compressor-condenser means when the car is in motion to be condensed therein and for directing refrigerant vaporized in said heat exchanger to said thermal means when the car is at rest, means for connecting the compressor-condenser means to the thermal means when the car is in motion to accumulate energy in said thermal means, the energy accumulated in said thermal means when the car is in motion effecting operation of said thermal means to condense vaporized refrigerant supplied thereto when the car is at rest, selectively operable means for disconnecting the compressor-condenser means from the heat exchanger or the thermal means or both when the car is in motion, means for interrupting operation of the compressor-condenser means when the car is in motion and the compressor-condenser means is disconnected from both the heat exchanger and the thermal means, and means responsive to the speed of the car for determining the operation of the directing means and the means for connecting the compressor-condenser means to the thermal means.

9. In a refrigerating system, a heat exchanger for affecting the temperature of a fluid thereabout, a compressor, a condenser, an ice tank having a heat exchanger therein, pipe means interconnecting the heat exchangers, compressor and condenser, valve means in said pipe means for controlling flow through said pipe means, heat exchangers, compressor and condenser and operable to regulate flow of refrigerant whereby liquid refrigerant may be supplied to either or both of said heat exchangers to effect refrigeration therein and refrigerant vaporized in said heat exchangers may be returned to said compressor or refrigerant vaporized in the first-named heat exchanger may be returned to the compressor or the heat exchanger in said ice tank, means for maintaining a saturation pressure in the first-named heat exchanger higher than the saturation pressure maintained in the heat exchanger in said ice tank when liquid refrigerant is being supplied to both of said heat exchangers, and means independently controlling the admission of liquid refrigerant into said heat exchangers and independently regulating the refrigerating action therein.

10. In a refrigerating system, a heat exchanger for affecting the temperature of a fluid thereabout, a compressor, a condenser, storage means having a thermal medium therein, a heat exchanger in said storage means, means interconnecting the heat exchangers, compressor and condenser in a closed circuit, means controlling flow of refrigerant through said closed circuit and operable to regulate flow of refrigerant whereby liquid refrigerant may be supplied to either or both of said heat exchangers to effect refrigeration therein and refrigerant vaporized in said heat exchangers may be returned to the compressor or refrigerant vaporized in the first-named heat exchanger may be returned to the compressor or the heat exchanger in said storage means, the thermal medium in said storage means being cooled when liquid refrigerant is supplied to the heat exchanger in said storage means and the cooled thermal medium condensing vaporized refrigerant supplied to the heat exchanger in said storage means, and independent means for regulating the flow of liquid refrigerant to said heat exchangers to independently regulate refrigeration therein.

11. In a refrigerating system, a heat exchanger for affecting the temperature of a fluid thereabout, a compressor, a condenser, an ice tank having a heat exchanger therein, pipe means interconnecting the heat exchangers, compressor and condenser, valve means in said pipe means for controlling flow through said pipe means, heat exchangers, compressor and condenser and operable to regulate flow of refrigerant whereby liquid refrigerant may be supplied to either or both of said heat exchangers to effect refrigeration therein and refrigerant vaporized in said heat exchangers may be returned to said compressor or refrigerant vaporized in the first-named heat exchanger may be returned to the compressor or the heat exchanger in said ice tank, and independent means for regulating the flow of liquid refrigerant to said heat exchangers to independently regulate refrigeration therein.

12. In a refrigerating system, a heat exchanger for affecting the temperature of a fluid thereabout, a compressor, a condenser, storage means having a thermal medium therein, a heat exchanger in said storage means, means interconnecting the heat exchangers, compressor and condenser in a closed circuit, means controlling flow of refrigerant through said closed circuit and operable to regulate flow of refrigerant whereby liquid refrigerant may be supplied to either or both of said heat exchangers to effect refrigeration therein and refrigerant vaporized in said heat exchangers may be returned to the compressor or refrigerant vaporized in the first-named heat exchanger may be returned to the compressor or the heat exchanger in said storage means, the thermal medium in said storage means being cooled when liquid refrigerant is supplied to the heat exchanger in said storage means and the cooled thermal medium condensing vaporized refrigerant supplied to the heat exchanger in said storage means, means for regulating the flow of liquid refrigerant to said heat exchangers to regulate refrigeration therein, means for by-passing the refrigerant about the means regulating flow of liquid refrigerant to the heat exchanger in said storage means when vaporized refrigerant is supplied to this heat exchanger to be condensed by the thermal medium, and pump means for circulating refrigerant condensed by said thermal medium.

13. In a refrigerating system, a heat exchanger for affecting the temperature of a fluid thereabout, a compressor, a condenser, storage means having a thermal medium therein, a heat exchanger in said storage means, means interconnecting the heat exchangers, compressor and condenser in a closed circuit, means controlling flow of refrigerant through said closed circuit and operable to regulate flow of refrigerant whereby liquid refrigerant may be supplied to either or both of said heat exchangers to effect refrigeration therein and refrigerant vaporized in said heat exchangers may be returned to the compressor or refrigerant vaporized in the first-named heat exchanger may be returned to the compressor or the heat exchanger in said storage means, the thermal medium in said storage means being cooled when liquid refrigerant is supplied to the heat exchanger in said storage means and the cooled thermal medium condensing vaporized refrigerant supplied to the heat exchanger in said storage means, means for regulating the flow of liquid refrigerant to said heat exchangers to regulate refrigeration therein, means for by-passing the refrigerant about the means regulating flow of liquid refrigerant to the heat exchanger in said storage means when vaporized refrigerant is supplied to this heat exchanger to be condensed by the thermal medium, pump means for circulating refrigerant condensed by said thermal medium, and common means for controlling the operation of the by-pass and circulating means.

14. In a refrigerating system, a heat exchanger for affecting the temperature of a fluid thereabout, a compressor, a condenser, an ice tank having a heat exchanger therein, pipe means interconnecting the heat exchangers, compressor and condenser, valve means in said pipe means for controlling flow through said pipe means, heat exchangers, compressor and condenser and operable to regulate flow of refrigerant whereby liquid refrigerant may be supplied to either or both of said heat exchangers to effect refrigeration therein and refrigerant vaporized in said heat exchangers may be returned to said compressor or refrigerant vaporized in the first-named heat exchanger may be returned to the compressor or the heat exchanger in said ice tank, means for regulating the flow of liquid refrigerant to said heat exchangers to regulate refrigeration therein, means for by-passing the refrigerant about the means regulating the flow of liquid refrigerant to the heat exchanger in said ice tank when vaporized refrigerant is supplied to the heat exchanger in said ice tank, and pump means for circulating refrigerant condensed in the heat exchanger in said ice tank.

15. In a refrigerating system, a heat exchanger for affecting the temperature of a fluid thereabout, a compressor, a condenser, an ice tank having a heat exchanger therein, pipe means interconnecting the heat exchangers, compressor and condenser, valve means in said pipe means for controlling flow through said pipe means, heat exchangers, compressor and condenser and operable to regulate flow of refrigerant whereby liquid refrigerant may be supplied to either or both of said heat exchangers to effect refrigeration therein and refrigerant vaporized in said heat exchangers may be returned to said compressor or refrigerant vaporized in the first-named heat exchanger may be returned to the compressor or the heat exchanger in said ice tank, means for regulating the flow of liquid refrigerant to said heat exchangers to regulate refrigeration therein, means for by-passing the refrigerant about the means regulating the flow of liquid refrigerant to the heat exchanger in said ice tank when vaporized refrigerant is supplied to the heat exchanger in said ice tank, pump means for circulating refrigerant condensed in the heat exchanger in said ice tank, and common means for controlling the operation of the by-pass and circulating means.

16. In an air conditioning system for a railway car or the like, a heat exchanger for affecting the temperature of air supplied to the car, a compressor, a condenser, a thermal medium tank having a heat exchanger therein, pipe means interconnecting said heat exchangers, compressor and condenser, valve means in said pipe means for controlling flow through said pipe means, heat exchangers, compressor and condenser and operable to regulate flow of refrigerant whereby liquid refrigerant may be supplied to either or both of said heat exchangers to effect refrigeration therein and refrigerant vaporized in said heat exchangers may be returned to said compressor or refrigerant vaporized in the first-named heat exchanger may be returned to the compressor or the heat exchanger in said tank, and means including a device under the control of and directly responsive to the speed of the car for determining operation of said valve means.

17. In an air conditioning system for a railway car or the like, a heat exchanger for affecting the temperature of air supplied to the car, a compressor, a condenser, a thermal medium tank having a heat exchanger therein, pipe means interconnecting said heat exchangers, compressor and condenser, valve means in said pipe means for controlling flow through said pipe means, heat exchangers, compressor and condenser and operable to regulate flow of refrigerant whereby liquid refrigerant may be supplied to either or both of said heat exchangers to effect refrigeration therein and refrigerant vaporized in said heat exchangers may be returned to said compressor or refrigerant vaporized in the first-named heat exchanger may be returned to the compressor or the heat exchanger in said tank, temperature responsive means for controlling the flow of liquid refrigerant to said heat exchangers, and means including a device under the control of and directly responsive to the speed of the car cooperating with said temperature responsive means to determine operation of said valve means.

18. In a refrigerating system, a heat exchanger for reducing the temperature of a fluid thereabout, means for conducting liquid refrigerant to said heat exchanger, a tank having water stored therein, a heat exchanger in said tank and adapted to be operated as an evaporator and as a condenser, means for supplying liquid refrigerant to the heat exchanger in said tank to effect operation thereof as an evaporator and freeze the water in said tank, throughout substantially the entire surface area of the latter, into ice, means for conducting refrigerant vaporized in the first-named heat exchanger to the heat exchanger in said tank whereby the ice in said tank effects operation of the heat exchanger in said tank as a condenser, means regulating the flow of refrigerant to the heat exchanger in said tank and determining operation thereof as an evaporator or as a condenser, and pump means for withdrawing refrigerant vaporized in the heat exchanger in said tank and for forcing it through the means conducting liquid refrigerant to the first-named heat exchanger whereby liquid refrigerant condensed in the heat exchanger may be returned to the first-named heat exchanger for vaporization therein.

19. In an air conditioning system for a railway car or the like, a heat exchanger for affecting the temperature of a fluid thereabout, a compressor, a condenser, storage means having a thermal medium therein, a heat exchanger in said storage means, means interconnecting the heat exchangers, compressor and condenser in a closed circuit, means controlling flow of refrigerant through said closed circuit and operable to regulate flow of refrigerant whereby liquid refrigerant may be supplied to either or both of said heat exchangers to effect refrigeration therein and refrigerant vaporized in said heat exchangers may be returned to the compressor or refrigerant vaporized in the first-named heat exchanger may be returned to the compressor or the heat exchanger in said storage means, the thermal medium in said storage means being cooled when liquid refrigerant is supplied to the heat exchanger in said storage means and the cooled thermal medium condensing vaporized refrigerant supplied to the heat exchanger in said storage means, means for regulating the flow of refrigerant to said heat exchangers to regulate refrigeration therein, and means including a device under the control of and directly responsive to the speed of the car for regulating operation of the means controlling flow of refrigerant through said closed circuit.

20. In an air conditioning system for a railway car or the like, a heat exchanger for affecting the temperature of a fluid thereabout, a compressor, a condenser, storage means having a thermal medium therein, a heat exchanger in said storage means, means interconnecting the heat exchangers, compressor and condenser in a closed circuit, means controlling flow of refrigerant through said closed circuit and operable to regulate flow of refrigerant whereby liquid refrigerant may be supplied to either or both of said heat exchangers to effect refrigeration therein and refrigerant vaporized in said heat exchangers may be returned to the compressor or refrigerant vaporized in the first-named heat exchanger may be returned to the compressor or the heat exchanger in said storage means, the thermal medium in said storage means being cooled when liquid refrigerant is supplied to the heat exchanger in said storage means and the cooled thermal medium condensing vaporized refrigerant supplied to the heat exchanger in said storage means, means for regulating the flow of refrigerant to said heat exchangers to regulate refrigeration therein, means for by-passing refrigerant about the means regulating flow of liquid refrigerant to the heat exchanger in said storage means when vaporized refrigerant is supplied to this heat exchanger to be condensed by the thermal medium, and means including a device under the control of and directly responsive to the speed of the car for regulating operation of the means controlling flow of refrigerant through said closed circut, said means responsive to the speed of the car also regulating operation of said by-passing means.

21. In a refrigerating system, a heat exchanger for affecting the temperature of a fluid thereabout, a multi-cylinder compressor, a condenser, storage means having a thermal medium therein, a heat exchanger in said storage means, means for interconnecting the heat exchangers, compressor and condenser in a closed circuit, means controlling flow of refrigerant through said closed circuit whereby liquid refrigerant may be supplied to either or both of said heat exchangers to effect refrigeration therein and refrigerant vaporized in said heat exchangers may be returned to the compressor or refrigerant vaporized in the first-named heat exchanger may be returned to the compressor or the heat exchanger in said storage means, the thermal medium in said storage means being cooled when liquid refrigerant is supplied to the heat exchanger in said storage means and the cooled thermal medium condensing vaporized refrigerant supplied to the heat exchanger in said storage means, and means cooperating with the flow controlling means and operable to connect all of the cylinders of said compressor to the one or the other of the heat exchangers in which refrigeration is being effected when refrigeration is being effected in but one of said heat exchangers or to connect selected of said cylinders to the first-named heat exchanger and other of the cylinders to the heat exchanger in said storage means when refrigeration is simultaneously effected in both of said heat exchangers.

22. In a refrigerating system, a heat exchanger for affecting the temperature of a fluid thereabout, a multi-cylinder compressor, a condenser, an ice tank having a heat exchanger therein, pipe means interconnecting the heat exchangers, compressor and condenser, and valve means in said pipe means for controlling flow through said pipe means, compressor and condenser and operable to regulate flow of refrigerant whereby liquid refrigerant may be supplied to either or both of said heat exchangers to effect refrigeration therein and refrigerant vaporized in said heat exchangers may be returned to the compressor or refrigerant vaporized in the first-named heat exchanger may be returned to the compressor or the heat exchanger in said ice tank, selected of said valve means operating to connect all of the cylinders of said compressor to the one or the other of the heat exchangers in which refrigeration is being effected when refrigeration is being effected in but one of said heat exchangers or to connect selected of the cylnders to the first-named heat exchanger and other of the cylinders to the heat exchanger in the ice tank when refrigeration is simultaneously effected in both of said heat exchangers.

23. In a refrigerating system, a heat exchanger for affecting the temperature of a fluid thereabout, a multiple effect compressor having a pair of inlets, a condenser, storage means having a thermal medium therein, a heat exchanger in said storage means, means for interconnecting the heat exchangers, compressor and condenser in a closed circuit, means controlling flow of refrigerant through said closed circuit whereby liquid refrigerant may be supplied to either or both of said heat exchangers to effect refrigeration therein and refrigerant vaporized in said heat exchangers may be returned to the compressor or refrigerant vaporized in the first-named heat exchanger may be returned to the compressor or the heat exchanger in said storage means, the thermal medium in said storage means being cooled when liquid refrigerant is supplied to the heat exchanger in said storage means and the cooled thermal medium condensing vaporized refrigerant supplied to the heat exchanger in said storage means, and means cooperating with the flow controlling means and operable to connect both of the inlets of said compressor to the one or the other of the heat exchangers in which refrigerant is being effected when refrigeration is being effected in but one of said heat exchangers or to connect one of said inlets to the first-named heat exchanger and the other of the inlets to the heat exchanger in said storage means when refrigeration is simultaneously effected in both of said heat exchangers.

24. In a refrigerating system, a heat exchanger for affecting the temperature of a fluid thereabout, a multiple effect compressor having a pair of inlets, a condenser, an ice tank having a heat exchanger therein, pipe means inter-connecting the heat exchangers, compressor and condenser, and valve means in said pipe means for controlling flow through said pipe means, compressor and condenser and operable to regulate flow of refrigerant whereby liquid refrigerant may be supplied to either or both of said heat exchangers to effect refrigeration therein and refrigerant vaporized in said heat exchangers may be returned to the compressor or refrigerant vaporized in the first-named heat exchanger may be returned to the compressor or the heat exchanger in said ice tank, selected of said valve means operating to connect both of said inlets to one or the other of the heat exchangers in which refrigeration is being effected when refrigeration is being effected in but one of said heat exchangers or to connect one of said inlets to the first-named heat exchanger and the other of said inlets to the heat exchanger in the ice tank when refrigeration is simultaneously effected in both of said heat exchangers.

25. In a refrigerating system, a heat exchanger for reducing the temperature of a fluid thereabout, means for conducting liquid refrigerant to said heat exchanger, a water storage tank, a heat exchanger in thermal contact with said tank and adapted to be operated at different times both as an evaporator and as a condenser, means for supplying liquid refrigerant to the said second-named heat exchanger to effect operation thereof as an evaporator and freeze the water in said tank into ice, means for conducting refrigerant vaporized in the first-named heat exchanger to the said second-named heat exchanger whereby the ice in the said tank effects operation of the said second-named heat exchanger as a condenser, means regulating the flow of refrigerant to the second-named heat exchanger and determining operation thereof either as an evaporator or as a condenser, and pump means for withdrawing refrigerant vaporized in the second-named heat exchanger and for forcing it through the means conducting liquid refrigerant to the first-named heat exchanger whereby liquid refrigerant condensed in the said second-named heat exchanger may be returned to the first-named heat exchanger for vaporization therein.

WILLIAM GOODMAN.